(12) United States Patent
Geng

(10) Patent No.: US 12,209,449 B2
(45) Date of Patent: Jan. 28, 2025

(54) POWER-ASSISTANCE DEVICE

(71) Applicant: Johannes Geng, Freiburg (DE)

(72) Inventor: Johannes Geng, Freiburg (DE)

(\*) Notice: Subject to any disclaimer, the term of this patent is extended or adjusted under 35 U.S.C. 154(b) by 0 days.

(21) Appl. No.: 18/270,018

(22) PCT Filed: Jan. 14, 2022

(86) PCT No.: PCT/EP2022/050763
§ 371 (c)(1),
(2) Date: Jun. 28, 2023

(87) PCT Pub. No.: WO2022/152859
PCT Pub. Date: Jul. 21, 2022

(65) Prior Publication Data
US 2024/0068289 A1 Feb. 29, 2024

(30) Foreign Application Priority Data
Jan. 14, 2021 (DE) .......................... 102021000122.2

(51) Int. Cl.
*E05F 3/22* (2006.01)
*B64D 11/00* (2006.01)
*E05F 1/10* (2006.01)

(52) U.S. Cl.
CPC .............. *E05F 3/223* (2013.01); *E05F 1/105* (2013.01); *B64D 11/003* (2013.01); *E05Y 2900/502* (2013.01)

(58) Field of Classification Search
CPC ......... E05F 3/223; E05F 1/105; E05F 1/1091; B64D 11/003; F16F 9/56
See application file for complete search history.

(56) References Cited

U.S. PATENT DOCUMENTS

| | | | |
|---|---|---|---|
| 6,938,302 B2 * | 9/2005 | Lin .......................... | E05F 1/105 16/86 A |
| 8,806,715 B2 * | 8/2014 | Bienek ................ | F16K 31/0627 16/49 |
| 9,205,924 B2 * | 12/2015 | Geng .................... | B64D 11/003 |
| 9,273,505 B1 * | 3/2016 | Knittel ....................... | E05F 3/00 |
| 9,731,825 B2 * | 8/2017 | Cloud .................... | G05G 17/00 |
| 10,006,237 B1 * | 6/2018 | Qiu .......................... | E05F 5/027 |
| 10,315,768 B2 * | 6/2019 | Schorkhuber ........ | B64D 11/003 |
| 10,836,492 B2 * | 11/2020 | Boerschig ............ | B64D 11/003 |
| 11,821,248 B2 * | 11/2023 | Lee .......................... | E05F 1/105 |

(Continued)

FOREIGN PATENT DOCUMENTS

| | | |
|---|---|---|
| DE | 10343408 | 5/2005 |
| EP | 3371052 B1 | 9/2019 |

*Primary Examiner* — Jeffrey O'Brien
(74) *Attorney, Agent, or Firm* — Volpe Koenig

(57) ABSTRACT

A power-assist device (1) with a piston rod (8), which is mounted movably in a housing (7) and has a first position and a second position, and with a preferably elastic return element (12), which can be arrested by a positionally variable arresting part (10) and which, in the unlocked state, can transmit an assisting force to the piston rod (8) and, in the arrested state, is decoupled in terms of force from the piston rod (8), such that, in the unlocked state, as a result of the piston rod (8) being moved into the first position, the arresting part (10) is moved out of an unlocking position into an arresting position, which enables arresting of the restoring return (12) only within a limited time period.

20 Claims, 14 Drawing Sheets

(56) References Cited

U.S. PATENT DOCUMENTS

| | | | |
|---|---|---|---|
| 2011/0253714 A1* | 10/2011 | Ivester | F03G 1/00 16/72 |
| 2016/0229537 A1* | 8/2016 | Scown | B65D 90/54 |
| 2019/0257127 A1* | 8/2019 | Hogan | E05F 1/1091 |
| 2020/0024878 A1* | 1/2020 | Kim | F25D 29/006 |

* cited by examiner

POWER-ASSISTANCE DEVICE

CROSS-REFERENCE TO RELATED APPLICATIONS

This application is the U.S. National Phase of PCT Appln. No. PCT/EP2022/050763, filed Jan. 14, 2022, which claims priority from German Patent Application No. 10 2021 000 122.2, filed Jan. 14, 2021, the entire disclosures of which are incorporated by reference herein.

TECHNICAL FIELD

The invention relates to a power assist device. It can preferably serve to reduce a force that is to be applied by an operator to move a piston rod. The invention also relates to a method for operating a power assist device.

BACKGROUND

A field of application of such power assist devices is for example luggage compartments in passenger aircraft. The power assist devices serve to make it easier for operators, in particular flight attendants, to close the luggage compartments, which are loaded up with items of luggage. For occupational safety reasons and for greater comfort, the force that is to be applied to close the luggage compartment manually should not exceed a certain value. For this reason, use is made of power assist devices, which provide an assistance force for closing the luggage compartment when a certain load capacity is reached. This assistance force should be dimensioned such that the loaded-up luggage compartment can be opened again utilizing gravitational force.

Such a power assist device may be configured such that an unlocking button must be pressed by the operator to provide or activate the assistance force. Frequently, however, automatic assistance which is activated upon reaching a certain load capacity in the luggage compartment is desired. Such systems are generally provided with an electronic controller, which connects up a spring via an electromagnet. A system of this type, however, cannot be readily retrofitted, since it makes it necessary to supply electrical energy or to mount certain components on the existing luggage compartment.

SUMMARY

The invention is based on the object of providing a power assist device which can provide an assistance force without supply of electrical energy, wherein in particular the assistance force is provided automatically when a certain level of loading of the luggage compartment is exceeded.

To achieve the stated object, one or more of the features as disclosed herein can be provided. In particular, what is therefore proposed to achieve the stated object is that a power assist device comprises a movably mounted piston rod, which has a first position and a second position, and a return element, which can be arrested by means of a positionally variable arresting means, by means of which an assistance force can be transmitted to the piston rod in the unlocked state, and which in the arrested state is decoupled in terms of force by the piston rod, wherein, in the unlocked state, a movement of the piston rod to the first position moves the arresting means from an unlocking position to an arresting position, which enables arresting of the return element only for a limited period of time.

It is therefore possible to let the assistance force act on the piston rod irrespective of the state of the arresting means. The piston rod can be moved between the various positions in the arrested state in a manner unaffected by the return element. The first position may for example be a position in which the piston rod is extended. The second position may for example be a position in which the piston rod is retracted. However, it may also be strictly the other way around. When the invention is used for a preferably lowerable luggage compartment in an aircraft, the first position is preferably a position in which the luggage compartment is open and the second position is a position in which the luggage compartment is closed.

The assistance force preferably assists a movement of the piston rod from the first to the second position. It may therefore be the case that the assistance force counteracts a movement of the piston rod from the second to the first position. The arresting means may be movable into an arresting position, in which the return element is arrestable and/or arrested. The arresting means may be movable into an unlocking position, in which the return element is unlocked. The return element is preferably not arrestable in the unlocking position of the arresting means; the arresting means must then rather firstly be moved into the arresting position.

If, in the event of the arresting means being in the unlocking position, the piston rod is brought from the second to the first position, the arresting means is preferably moved into the arresting position. The return element can then be arrested for a limited period of time. It may be provided, for example, that arresting takes place within the period of time when the force acting on the piston rod toward the first position drops below the force generated by the return element toward the second position.

The period of time preferably lasts 20 seconds, particularly preferably 10 seconds, very particularly preferably 5 seconds from adoption of the arresting position. After this period of time, the return element remains unlocked and can be arrested only after the arresting means has been brought back to the arresting position again and the limited period of time has restarted. If the return element has been arrested, the movement of the piston rod from the first to the second position is no longer assisted. If the force acting on the piston rod toward the first position increases again and exceeds for example the force generated by the return element, it can be provided that the limited period of time restarts. After the period of time has elapsed, the arresting means is in the unlocking position and the force generated by the return element assists the movement of the piston rod from the first to the second position.

The return element is preferably an elastic return element. Particularly preferably, the return element is a spring, in particular a helical spring. The return element may be a tension spring or a compression spring. The return element may also be a gas pressure spring. The piston rod preferably runs through the return element.

Preferably, the piston rod is mounted movably in a housing. The housing may completely enclose a portion of the piston rod. The housing may also be open and merely take on the function of a bearing. The housing may at the same time be in the form of a holder for holding the power assist device on another object, such as a luggage compartment.

The housing is preferably cylindrical.

The housing may comprise one or more housing parts. For example, a further housing part may be formed around a cylindrical housing part of constant radius in one region, the further housing part enclosing the cylindrical housing part and further components. It may for example also be provided that a first housing part encloses the return element and a second housing part encloses the arresting means. A third housing part, which encloses a force generating device by means of which a force can be applied to the arresting means, may also be formed in this respect.

The piston rod preferably protrudes beyond the housing on at least one side of the latter.

The return element is preferably arranged in the housing.

The power assistance device may have a fixed end and a movable end. In this case, the movable end may be an end of a region, guided outward from the housing interior space, of the piston rod that is furthest away from the housing.

As already noted, it may be provided that the operator is automatically assisted in the event of a manual movement of the piston rod in at least one direction. It may be provided that the power assist device is automatically activated by a counter force that exceeds a certain value. The invention is preferably designated for installation in luggage compartments with a lowerable luggage space and in particular for use in passenger aircraft. In that case, the aforementioned counter force results in particular from the weight force of the items of luggage loaded in the luggage compartment and the power assist device preferably assists the operator in closing the luggage compartment.

In an advantageous embodiment, it can be provided that the return element can be arrested and unlocked when powered off.

Therefore, the power assist device can be fully operated from the outside without supply of electrical energy. It is also advantageous that it is not necessary to lay any power cables that serve to supply electrical energy to the power assist device. This furthermore facilitates retrofitting in already existing luggage compartments.

In order to selectively limit the period of time, in an advantageous embodiment of the power assist device it may be provided that, in the unlocked state in the arresting position, a force generated by a preferably mechanical and/or hydraulic arresting means movement device acts on the arresting means and has the effect of automatically moving the arresting means back to the unlocking position. The arresting means movement device is preferably a mechanical arresting means movement device. The force acting on the arresting means is preferably generated in that the arresting means movement device has a movable component, which makes mechanically contact with the arresting means and forcibly moves it from the arresting position to the unlocking position. A controlled movement of the movable component then leads to a controlled movement of the arresting means.

It is preferably provided that the aforementioned arresting means movement device comprises a damping mechanism. A damping mechanism may in particular be characterized in that it retards a movement. The damping mechanism is preferably a hydraulic damping mechanism. The damping mechanism may also be a mechanical retarding mechanism. The damping mechanism may for example be an egg timer mechanism. The damping mechanism may comprise a damping element which retards a movement of the arresting means. To this end, it may be provided that the movement of the arresting means is directly damped. Preferably, however, it is provided that the movement of a component, such as the component already mentioned above, that was moved by the arresting means movement device and transmits a force to the arresting means is damped. The damping mechanism may generate a retarding counter force which slows down a movement of the arresting means.

Therefore, it is possible to set the period of time in which the arresting means moved into the arresting position can still be arrested, for example on the basis of the retardation created by the damping mechanism. This period of time preferably lasts 20 seconds, particularly preferably 10 seconds, very particularly preferably 5 seconds from adoption of the arresting position. The force is preferably generated and brought about mechanically.

As an alternative or in addition, it can be provided that, in the arrested state, a movement of the arresting means from the arresting position to the unlocking position is prevented.

Therefore, the risk of inadvertent unlocking of the arresting means can be prevented or avoided. For example, the arresting means in its arresting position can engage in a counter support, with the result that the arresting means cannot be readily moved into the unlocking position.

In an advantageous embodiment, it may be provided that the arresting means movement device has a mechanical auxiliary return element which is preferably in the form of a spring. This is a different return element to the return element already mentioned above, which generates the assistance force. That return element is not part of the aforementioned arresting means movement device.

Therefore, the arresting means movement device may for example be brought from a position associated with the arresting position of the arresting means to a position associated with the unlocking position of the arresting means by means of the auxiliary return element of the arresting means movement device. If a movement of the piston rod causes the arresting means to move to the arresting position, the arresting means can be brought into the unlocking position by the auxiliary return element of the arresting means movement device.

As an alternative or in addition, it may be provided that the arresting means movement device comprises a movable lifting element and/or a hydraulic damping element. Preferably, the damping element retards a movement of the lifting element.

It is therefore possible to realize a limited period of time in which the lifting element can be brought from a first to a second position. A first position of the lifting element may for example be associated with a loaded mechanical auxiliary return element of the arresting means movement device and an arresting means in the arresting position. The lifting element can then be brought from the first position to a second position, which is associated with an arresting means in the unlocking position. The movement of the lifting element can be driven by the auxiliary return element of the arresting means movement device and retarded by the damping element. In this way, it is possible to select a period of time within which the return element of the power assist device can still be arrested. The movement of the lifting element from the second to the first position can be triggered by the movement of the arresting means from the unlocking position to the arresting position.

As an alternative or in addition, it may be provided that a force that was generated by the arresting means movement device and acts on the arresting means is chosen such that the movement of the arresting means from the arresting position to the unlocking position is retarded, in particular lasts for a period of time of 20 seconds, preferably 10 seconds, particularly preferably 5 seconds.

This can for example be realized by a balance between the respectively counteracted forces of the damping element and of the auxiliary return element of the arresting means movement device. Therefore, the period of time within which the return element of the power assist device can still be arrested is determined.

In an advantageous embodiment, it can be provided that the arresting takes place in that the piston rod is moved from the first position to an intermediate position between the first and the second position, in particular wherein the arresting is triggered in that the piston rod is moved from the intermediate position toward the first position.

As an alternative or in addition, it can be provided that the arresting takes place in that a loading force acting on the piston rod is lowered below the force brought about by the return element.

If, for example, a luggage compartment is opened in the unlocked state of the power assist device, that is to say counter to the assistance force that is acting, and in the process the piston rod moves from the second to the first position, a reduction in the force acting counter to the assistance force can allow the movement of the piston rod to the intermediate position between the first and the second position. The force can be lowered, for example, by removing items of luggage. If the resulting force is smaller than the assistance force, the return element of the power assist device will move the piston rod toward the second position. This return element is arrested as soon as the intermediate position is reached, provided that this return movement still took place within the limited period of time. If the piston rod is then moved back to the first position, the return element of the power assist device can be unlocked, whereupon the assistance force acts on the piston rod. Therefore, the assistance force must be overcome to unlock the return element of the power assist device. This can be done by the loading of luggage into a luggage compartment with an arrested return element of the power assist device.

In an advantageous embodiment, it can be provided that the arresting takes place by latching the arresting means, which is preferably in the form of a hook, to a latching element. Preferably, the latching element has a counter support for the return element.

Therefore, in an arresting position of the arresting means, latching to a latching element which can block the action of the return element of the power assist device can take place. For example, in the event of a movement of the piston rod from the first position toward the second position, the return element can move the latching element toward the hook such that the return element is arrested.

In an advantageous embodiment, it may be provided that an oblique region, which can slide on a locking element, is formed on the arresting means, in particular wherein the locking element is a contacting component, for example the contacting component that is mentioned later on, or a valve, for example the valve that is mentioned later on.

Therefore, the oblique region can be chosen such that it can slide on the locking element in more than one position of the arresting means. The contacting component may be a portion of the latching element. If the arresting means is moved from the arresting position to the unlocking position over the limited period of time, multiple intermediate positions of the arresting means can allow the arresting. The arresting means via its oblique region can slide along on the locking element into the arresting position from multiple positions which do not correspond to the unlocking position. Therefore, the arresting is not adversely affected if the arresting means has already moved somewhat toward the unlocking position.

In an advantageous embodiment, it can be provided that the return element is clamped in between a first counter support, which is fixedly connected to the housing, and a second counter support, which is mounted so as to be able to move relative to the housing. Preferably, the second counter support is mounted movably in the housing.

Therefore, the position of one end of the return element can be set relative to the housing. One end of the return element may be mounted movably and, at least in the event of movement in one direction, may be coupled to the movement of the piston rod. The return element may be attached such that it can assist the movement of the piston rod in a manner supported against the housing.

As an alternative or in addition, it may be provided that a or the second counter support is connected fixedly in terms of movement to a or the contacting component preferably via a connecting element which runs toward the piston rod.

Therefore, the movable counter support may be connected by a force fit and/or form fit to the latching region of the latching element, for example via an inner sleeve. In the event of arresting being performed preferably by a form fit between the arresting means and the latching element, the movement of the movable counter support is restricted such that the return element is arrested. The arresting can also be brought about via a force fit. The latching element and the movable counter support may thus be spaced apart from one another. Here, the relative spacing between the latching element and the movable counter support is preferably invariable.

In an advantageous embodiment, it can be provided that the power assist device comprises two fluid chambers, which are filled with a hydraulic liquid and are connected to one another by way of a valve, wherein the volume of one of the two fluid chambers, in particular the volume ratio of the two fluid chambers in relation to one another, is set by a length of the return element, and that the valve in the open state forms the unlocked state. As an alternative or in addition in this respect, it can be provided that the valve in the closed state forms the arrested state.

Therefore, the fluid chambers form a hydraulic system. A valve must be open in order that the return element can move and transmit the assistance force. Further valves may be provided. For example, a valve may be a non-return valve. Therefore, a movement of the return element in one direction can be facilitated. This can be the direction in which the return element is moved by the operator. Therefore, the operating comfort is increased. A valve may also be influenced by the arresting means.

In an advantageous embodiment, it may be provided that the arresting means in the unlocking position keeps the valve in the open state, in particular by locking the valve.

Therefore, the movement of the return element can be enabled by the arresting means in that it keeps the valve open and thus allows the change in volume of a fluid chamber, in particular the volume ratio of the two fluid chambers in relation to one another. If the valve is additionally locked, the risk of inadvertent closing can be avoided or alleviated.

In an advantageous embodiment, it can be provided that a mating contact is coupled in terms of movement to the arresting means and that the movement of the piston rod to the first position causes mechanical contact to be made between a contacting component, moved by the piston rod, and the mating contact and a movement thereof, with the result that the arresting means is moved from the unlocking position to the arresting position. Preferably, a cam is formed on the mating contact.

Therefore, the movement of the arresting means to the arresting position when the piston rod is moved from the second to the first position can be ensured. Then, there is the option of arresting the return element.

In an advantageous embodiment, it may be provided that a movement of the piston rod from the first to the second position causes mechanical contact to be made between the contacting component, moved by the piston rod, and the mating contact and a return movement thereof, wherein the return movement is decoupled by the arresting means.

In an advantageous embodiment, it can be provided that the arresting means is in the form of a hook.

Therefore, it is possible to straightforwardly latch the arresting means to a latching element, which can be coupled in terms of movement to the return element.

As an alternative or in addition, it may be provided that the arresting means is mounted so as to be rotatable about a point of rotation, in particular wherein the point of rotation is connected to the housing in a positionally invariable manner.

Therefore, the arresting means can be latched to a latching element by rotation. The movement space of the arresting means can thus be delimited. Preferably, a rotation about a point of rotation brings the arresting means from the unlocking position to the arresting position. Within the limited period of time in which the arresting is possible, the arresting means can be rotated from the arresting position to the unlocking position.

In an advantageous embodiment, it may be provided that a or the mating contact is implemented on a component which is mounted so as to be able to rotate about a point of rotation which is preferably connected to the housing in a positionally invariable manner, in particular wherein the component from a starting position moves the arresting means to the arresting position when rotated in a direction of rotation.

Therefore, the mating contact can be positioned spaced apart from the arresting means. The rotation of the component with the mating contact in at least one direction of rotation can be decoupled from a rotation of the arresting means, whereas in the other direction it can cause the arresting means to rotate. In particular, this makes it possible for a movement of the contacting component moved by the piston rod, for example when the piston rod moves from the second to the first position, to trigger a movement of the arresting means by rotation of the component. In the event of a movement of the piston rod from the first position toward the second position, for example to arrest the return element, the contacting component can rotate the component in the other direction. The arresting means in the arresting position can remain unaffected by this and arrest the return element.

As an alternative or in addition, it may be provided that, in the event of deflection from a or the starting position, a return force that returns the component to its starting position acts on the component.

Therefore, after the mating contact is contacted by the contacting component, the component can be brought back to the starting position and is available again for deflection by contact being made with it by the contacting component. It can thus be ensured that, upon any movement of the piston rod from the second to the first position, the arresting means moves to its arresting position.

As an alternative or in addition, to achieve the stated object the features of the alternative independent claim directed to a method for operating a power assist device are provided. In particular, what is therefore proposed to achieve the stated object in the case of a method for operating a power assist device is that the power assist device is initially in the unlocked state and the piston rod is in the second position, that then a force which exceeds and counteracts the assistance force is applied to the piston rod, with the result that it moves into the first position, and in that subsequently, within the period of time, the applied force is lowered below the assistance force, with the result that the return element arrests.

It may be provided in this respect that the lowering of the applied force has the effect that the piston rod moves up to an intermediate position, in which the return element arrests, within the period of time.

Therefore, the advantages described can be utilized for the operation of a power assist device. In particular, this relates to power assist devices for installation in lowerable luggage compartments in passenger aircraft. The second position is in particular a position in which the luggage compartment is closed. Therefore, a closed luggage compartment with a load capacity which causes a weight force that exceeds the assistance force has a power assist device in the unlocked state with a piston rod in the second position. While the luggage compartment is being opened, it is unlocked and a force which exceeds and counteracts the assistance force is applied to the piston rod. The luggage compartment opens and in the process moves the piston rod into the first position. By removing luggage, the force applied to the piston rod can be lowered below the assistance force. If this occurs within the limited period of time, the arresting takes place. Depending on the embodiment, the arresting can take place for example in that the piston rod moves into an intermediate position, in which the return element arrests, within the period of time owing to the assistance force. The luggage compartment therefore remains open owing to the gravitational force and the assistance force only acts again when there is a corresponding load capacity in the luggage compartment.

The invention may in particular relate to a purely mechanical and/or hydraulic system which does not have an external energy supply and has the following features:

A compression spring is kept in its loaded position (locking position) using a mechanical locking mechanism. In the application, this may be the case if the luggage compartment is empty and a spring force is not required for closing.

When there is a predefined force on the mechanism that is greater than the locked spring pre-tensioning force, a timer with a period of time of for example 10 s is automatically activated;

After the period of time has elapsed, the spring is automatically unlocked, with the result that the spring force assists the operator in closing the luggage flap;

If the spring reaches the locking position again (luggage compartment is opened), it is automatically locked and the timer restarts;

If the predefined force on the mechanism is removed by removing luggage from the open luggage compartment before the period of time of for example 10 s has elapsed, the timer is reset, with the result that upon subsequent reapplication of the predefined force the period of time of for example 10 s elapses again until the spring is unlocked.

The invention can also relate to a locking mechanism which contains a locking hook with an inclined plane. The locking mechanism may be configured such that this locking hook is kept in the locked position by the spring force that is to be locked. If the spring force that is to be locked does not act on the locking hook, the latter is brought out of the locked state via a hydraulic damping mechanism. The hydraulic damping mechanism temporally retards this unlocking. The mechanism may contain a deflection cam and a latching element, preferably with a cutout which causes the locking hook, which is normally in the unlocked state, to overlap the latching element.

BRIEF DESCRIPTION OF THE DRAWINGS

The invention will now be described in more detail on the basis of exemplary embodiments, but is not restricted to these exemplary embodiments. Further exemplary embodiments will emerge from combining the features of individual or multiple claims with one another and/or with individual or multiple features of the exemplary embodiments or the variants of the invention that were described above.

In the figures.

DETAILED DESCRIPTION

Figure 1:
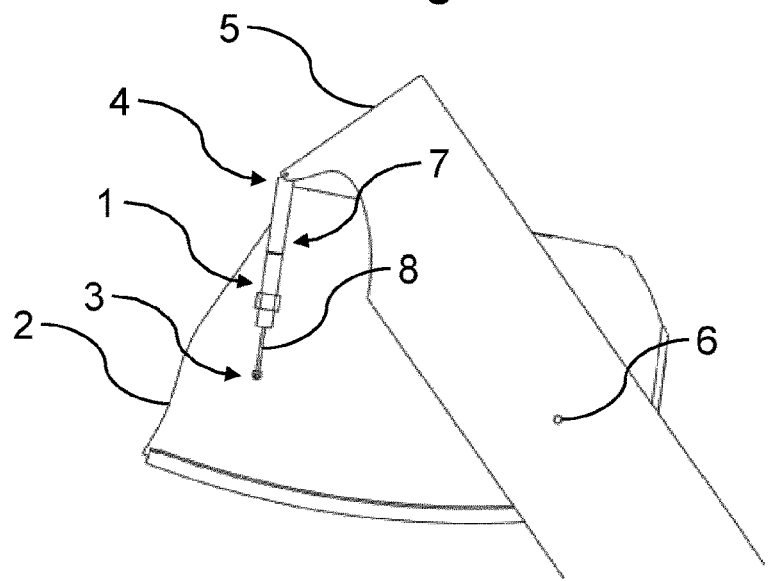
FIG. 1 shows a luggage compartment with a power assist device according to the invention in an open state.

FIG. 1 shows a power assist device 1, which is mounted on a luggage compartment 2. The luggage compartment 2 is in an open state. A movable end 3 of the power assist device 1 is attached to the luggage compartment 2 and a fixed end 4 is attached to a support 5. The luggage compartment 2 rotates about a point of rotation 6 when being opened and closed. The power assist device 1 has a housing 7, which is in the form of a cylinder housing and in which there is a movably mounted piston rod 8.

Figure 2:
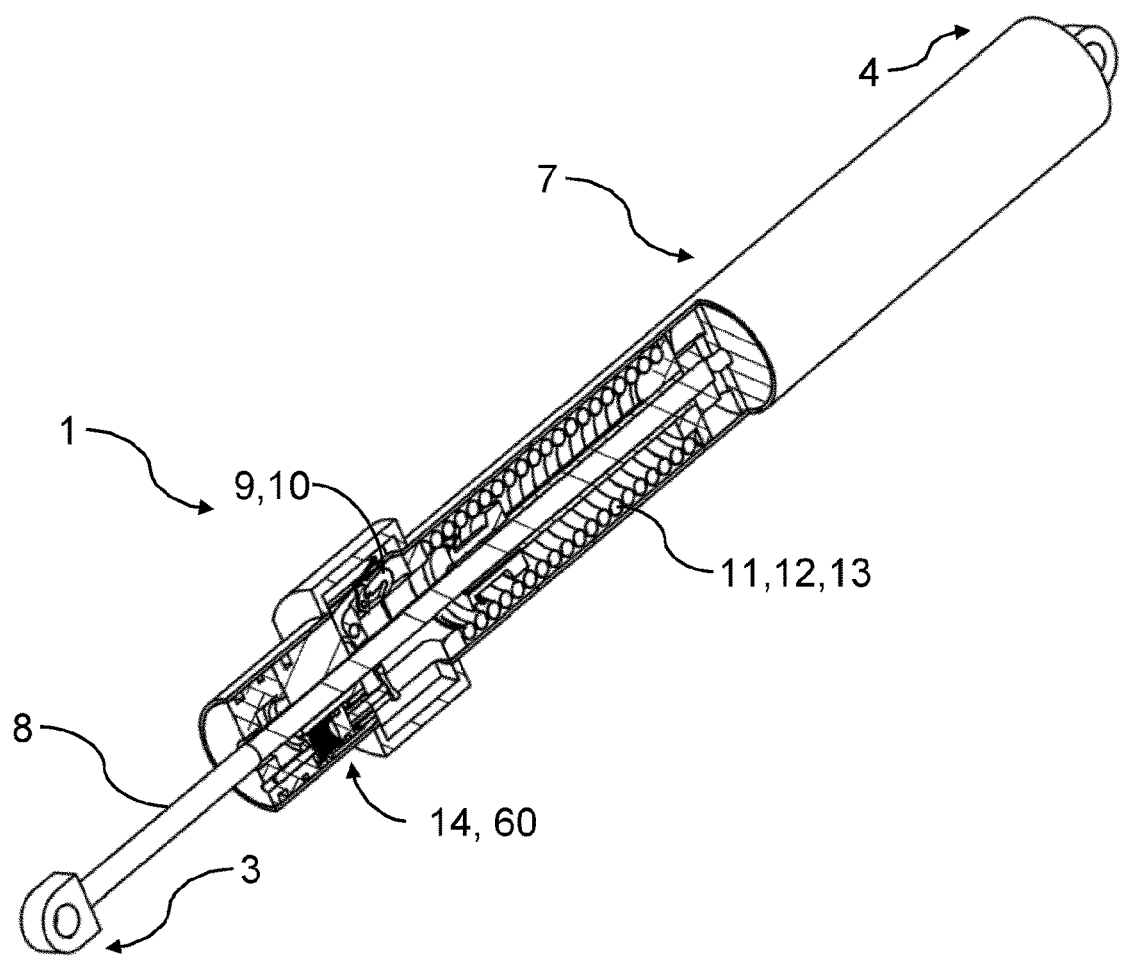
FIG. 2 shows a perspective sectional illustration through a power assist device according to the invention in the unlocked state.

FIG. 2 shows a partial longitudinal section through the power assist device 1 with the movable end 3, the fixed end 4, the housing 7 and the piston rod 8. Also illustrated are an arresting means 10 in the form of a hook 9 and a return element 12 in the form of a spring 11. The spring 11 is a compression spring 13 in this exemplary embodiment. An arresting means movement device 60 with a damping mechanism 14 keeps the arresting means 10 in its unlocked position.

Figure 3:
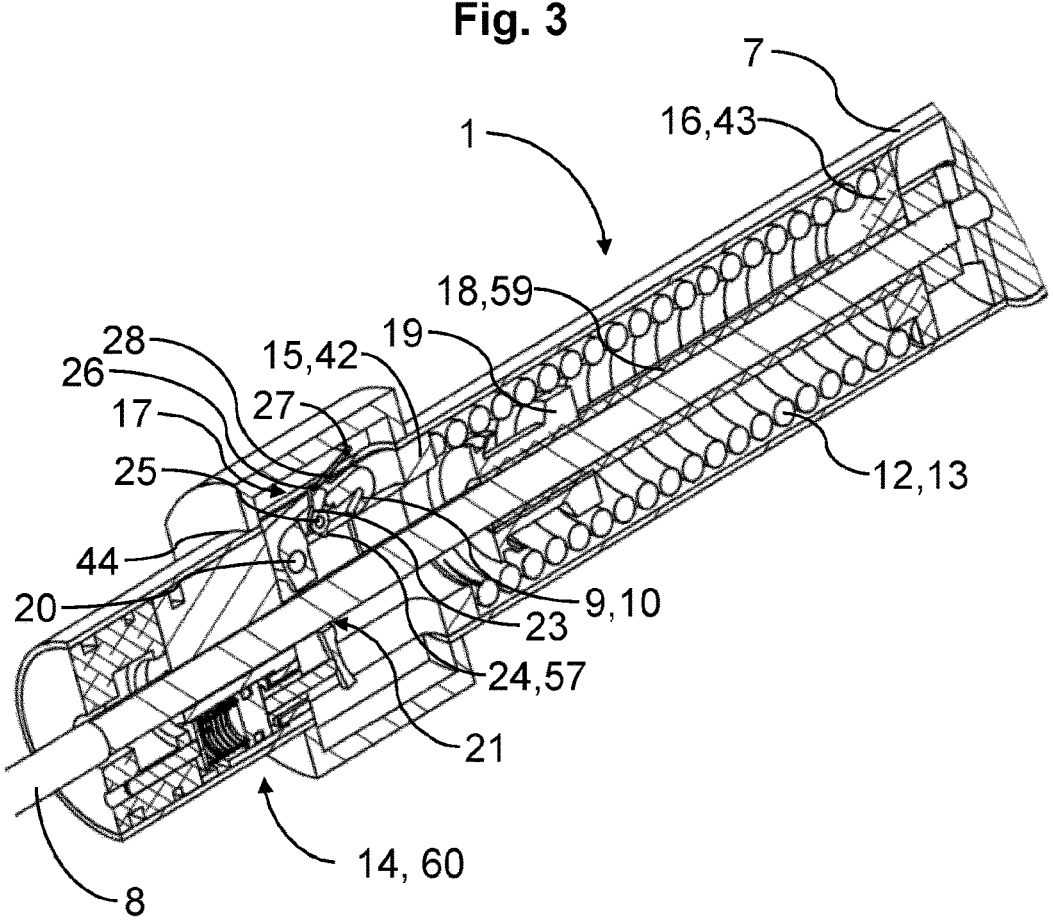
FIG. 3 shows a perspective sectional illustration through a power assist device according to the invention in the unlocked state.

FIG. 3 shows an enlarged view of the internal components of the power assist device 1. The return element 12 in the form of a compression spring 13 is supported against the locking housing 15, this constituting a counter support 42 fixedly connected to the housing part 44, or a fixed bearing. The return element 12 is moreover supported against a spring disk 16, this constituting a counter support 43 which is mounted movably in the housing part 44, or a floating bearing. The locking housing 15 surrounds the arresting mechanism 17. The spring disk 16 is connected to the latching element 19 via a connecting element 59 in the form of a casing tube 18. The housing part 44 incorporates multiple components of the power assist device 1, such as the housing 7 and the locking housing 15, or encloses them.

The hook 9 is rotatable about a point of rotation 20 and can thus be brought into engagement with the latching element 19 in order to arrest the return element 12. The hook 9 has a cutout 21, through which the piston rod 8 runs. The latching element 19 can be arrested by the arresting means 10 and then extends into the locking housing 15.

A movable component 23 with a cam 24 is mounted on the locking housing 15 so as to be rotatable about a point of rotation 25. This component may be contacted by the latching element 19 and is thus a mating contact 57 with respect to the latching element 19. A tension spring 28 is tensioned between a point 26 on the movable component 23 and a point 27 on the locking housing 15. The pre-tensioning of the tension spring 28 keeps the movable component 23 in contact with the arresting means 10.

Also shown is the damping mechanism 14, which acts on the arresting means 10.

Figure 4:
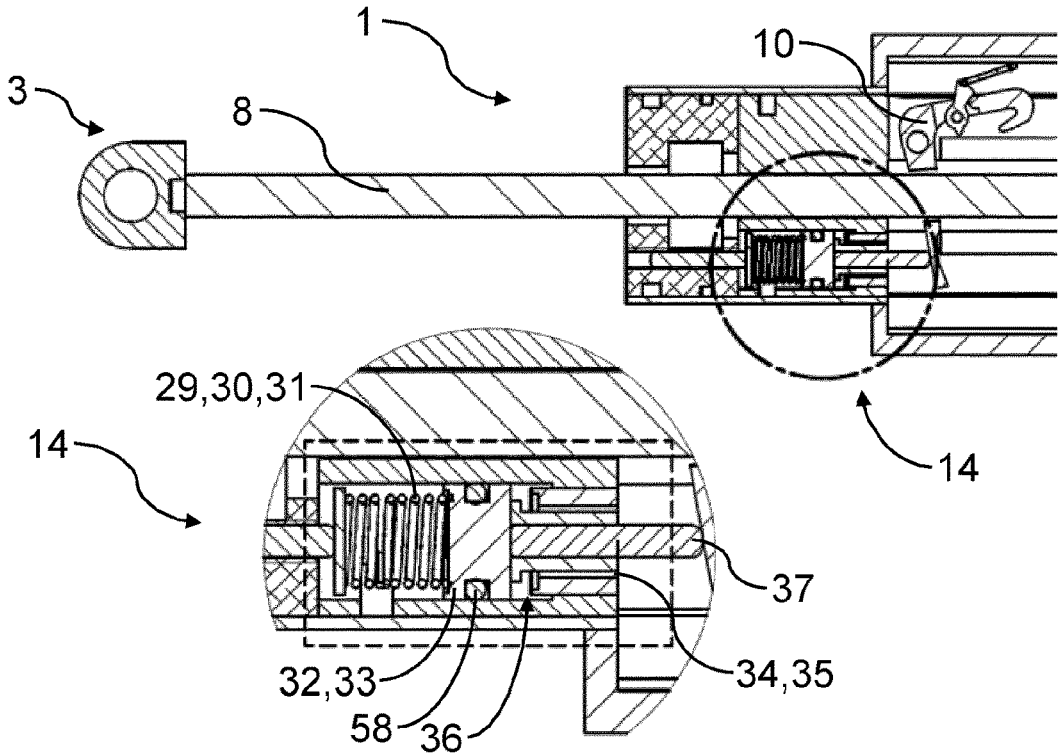
FIG. 4 shows an enlarged illustration of the movable end of a power assist device according to the invention with the damping mechanism in a sectional illustration.

FIG. 4 shows an enlarged illustration of the movable end 3 of a power assist device 1 according to the invention with an arresting means movement device 60, which comprises the damping mechanism 14, in a sectional illustration and an enlarged depiction of the damping mechanism 14. The arresting means 10 is in the unlocking position. The damping mechanism 14 preferably has a hydraulic form and comprises a mechanical auxiliary return element 31, in the exemplary embodiment in the form of a spring 29 which is a compression spring 30, and a movable lifting element 33 in the form of a piston 32. A connecting channel 34 forms a hydraulic damping element 35. A non-return valve 36, a tappet 37 and a seal 58 are also formed.

The damping mechanism 14 is designed such that the force of the mechanical auxiliary return element 31 is transmitted to the tappet 37 and then to the arresting means 10 via the movable lifting element 33. The arresting means is therefore pressed into the unlocking position by the damping mechanism 14 and preferably held there. If a movement of the piston rod 8 causes the arresting means 10 to be brought into the arresting position, the latter presses the tappet 37 into the damping mechanism 14. Hydraulic liquid flows through a connecting channel 34 and the non-return valve 36 into the damping mechanism 14 and the compression spring 30 is tensioned.

The compression spring 30 tends to relax and as a result to move the tappet 37 out of the damping mechanism 14 again, whereby the arresting means 10, which is in the arresting position, is moved into its unlocking position. In the process, the hydraulic liquid that has flowed in must leave the damping mechanism 14 again. The movement of the piston 32 toward the arresting means 10 is greatly retarded by contrast to the reverse movement, since the non-return valve 36 does not open in this direction and the flow cross section for the hydraulic liquid is greatly decreased. The piston 32 can be referred to as timer piston on the basis of its function, since it causes retardation of the return of the arresting means 10 to its unlocking position. Depending on the embodiment, the limited period of time can thus be set for example in the region of 20 seconds, preferably 10 seconds, particularly preferably 5 seconds.

Figure 5:
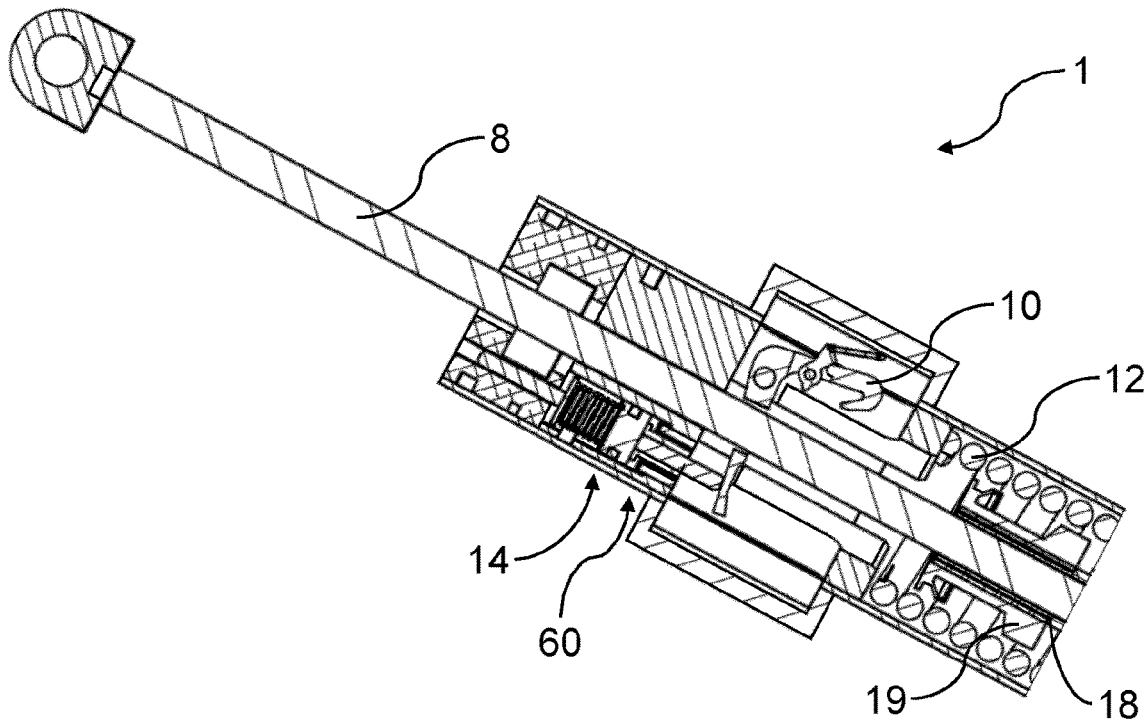
FIG. 5 shows a sectional illustration through the movable end of the power assist device from FIG. 4.

FIG. 5 shows a longitudinal section through a power assist device 1 according to the invention, wherein the arresting means movement device 60 by means of its damping mechanism 14 has pressed the arresting means 10 into its unlocking position and the latching element 19 is released. Since the latching element 19 is connected to the spring disk 16 via the casing tube 18, the return element 12 can expand and provide an assistance force for the movement of the piston rod 8 toward its second position.

Figure 6:
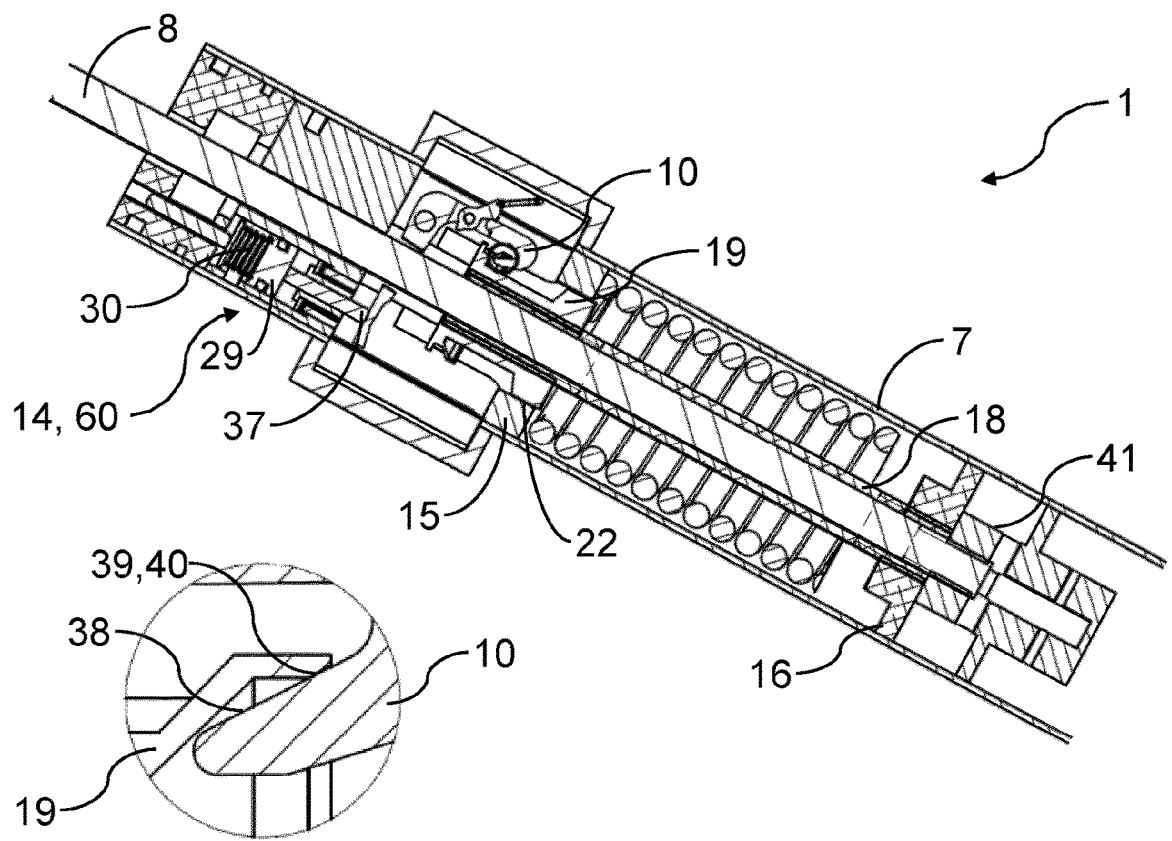
FIG. 6 shows a longitudinal section through the movable end of a power assist device according to the invention in the arrested state with the piston rod in the intermediate position, with an enlarged illustration of the interaction between the arresting means and the latching element.

The state shown in FIG. 6 corresponds to an open luggage compartment 2 without luggage load, with the arresting means 10 in the arresting position and the piston rod 8 in an intermediate position. FIG. 6 shows a longitudinal section through a power assist device 1 according to the invention, wherein the arresting means 10 is latched to the latching element 19, which extends into the locking housing 15. This is illustrated on an enlarged scale. The latching element 19 is supported radially against the circumferential surface 22 of the locking housing 15. The locking housing 15 can therefore take up radial forces acting on the latching element 19. These radial forces can result from the arresting means 10 engaging in the latching element 19.

An oblique region 38, which can slide on a locking element 39, is formed on the arresting means 10. The locking element 39 is a contacting component 40, which is in the form of a part of the latching element 19. The piston rod 8 is guided out of the housing 7 until the damper piston 41 makes contact with the spring disk 16. The engagement of the arresting means 10 in the latching element 19 keeps the compression spring 30 of the damping mechanism 14 under load via the tappet 37 and the piston 32.

Figure 7:
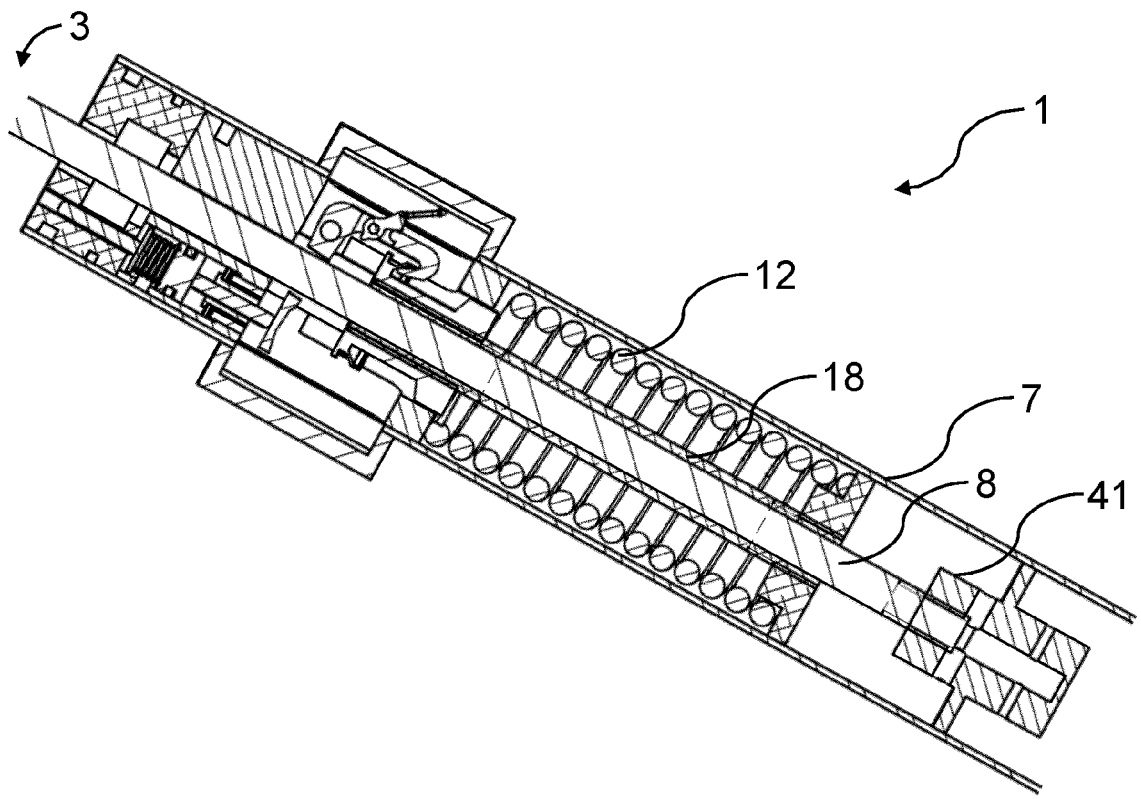
FIG. 7 shows a longitudinal section of the movable end of a power assist device according to the invention in the arrested state with the piston rod in the second position.

FIG. 7 shows a state in which, proceeding from the state shown in FIG. 6, the luggage compartment 2 was closed without a load of luggage. The piston rod 8, which is connected to the movable end 3, is moved together with the damper piston 41 through the casing tube 18 and the housing 7. The return element 12 remains arrested.

Figure 8:
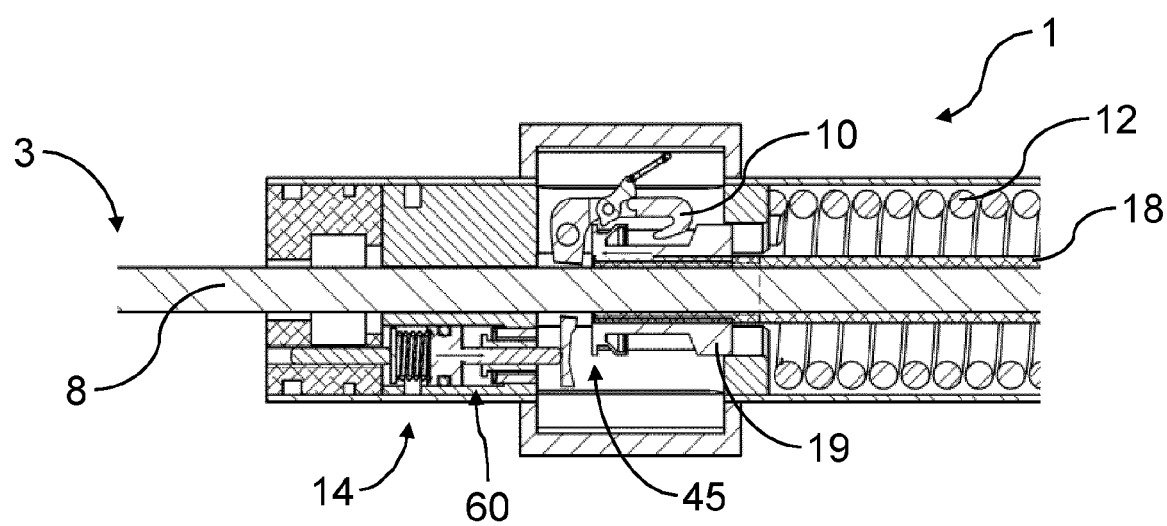
FIG. 8 shows a longitudinal section through the movable end of a power assist device according to the invention in the arrested state with the piston rod in the first position.

FIG. 8 shows a state in which, proceeding from the state shown in FIG. 6, the luggage compartment 2 was loaded with luggage, wherein the pre-tensioning of the return element 12 was overcome. As more luggage is loaded into the luggage compartment, a force acts on the return element 12 via the movable end 3, the piston rod 8, the damper piston 41 and the spring disk 16. The return element 12 is compressed further and the casing tube 18 moves the latching element 19 as far as the stop 45 and thus out of locking with the arresting means 10. The arresting means 10 is therefore released and can be moved from the arresting position to the unlocking position by the damping mechanism 14.

Figure 9:
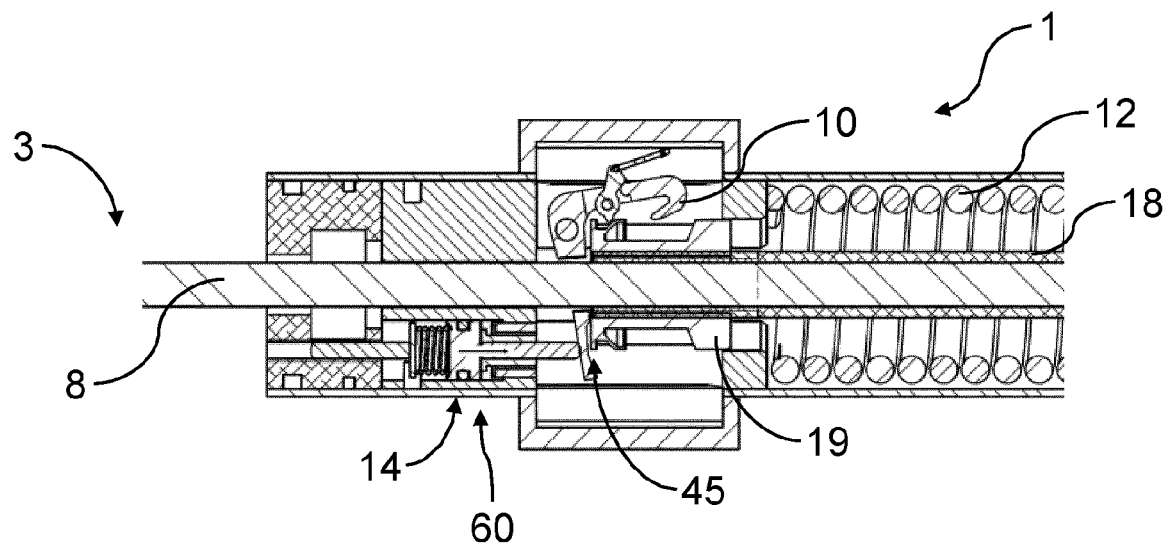
FIG. 9 shows a longitudinal section through the movable end of a power assist device according to the invention in the unlocked state with the piston rod in the first position.

FIG. 9 shows a state in which, proceeding from the state shown in FIG. 8, the arresting means 10 was brought into its unlocking position by the arresting means movement device 60 by means of its damping mechanism 14. The latching element 19 is released and the return element 12 assists the closing of the luggage compartment 2.

Figure 10:
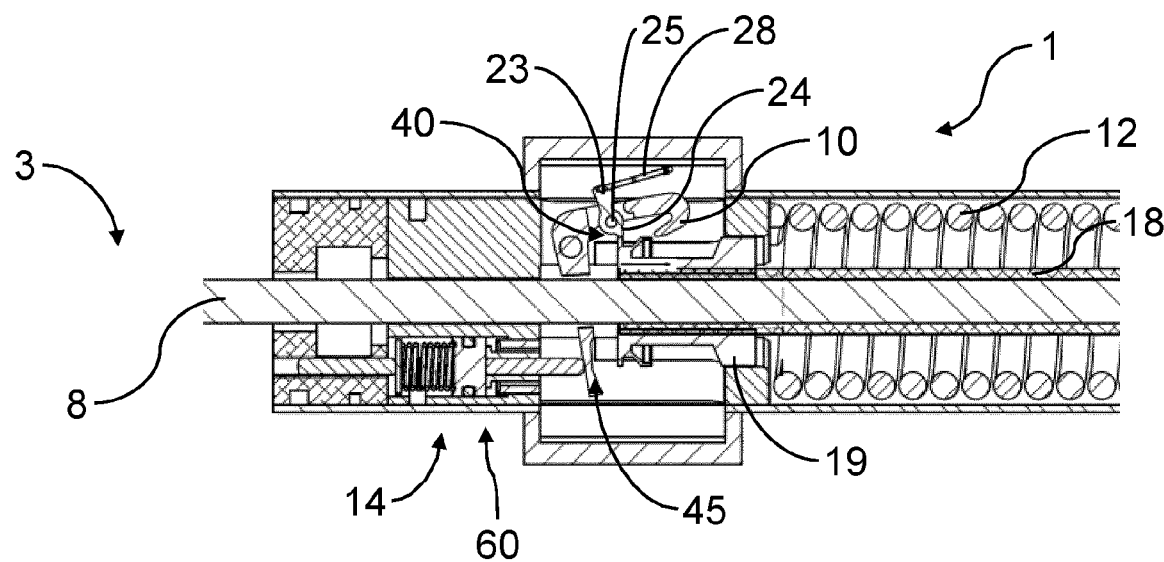
FIG. 10 shows a longitudinal section through the movable end of a power assist device according to the invention in the unlocked state with the piston rod in an intermediate position.

FIG. 10 shows a state in which, proceeding from the state shown in FIG. 9, the piston rod 8 was already moved far enough toward its second position that the contacting component 40 of the latching element 19 makes contact with the cam 24 of the movable component 23. Owing to the force acting on the cam 24, the movable component 23 rotates counter-clockwise about its point of rotation 25 with application of load to the tension spring 28 and the latching element 19 can pass the movable component. Also illustrated is that the arresting means 10 does not overlap the latching element 19, with the result that the return element 12 assists the closing of the luggage compartment 2.

Figure 11:
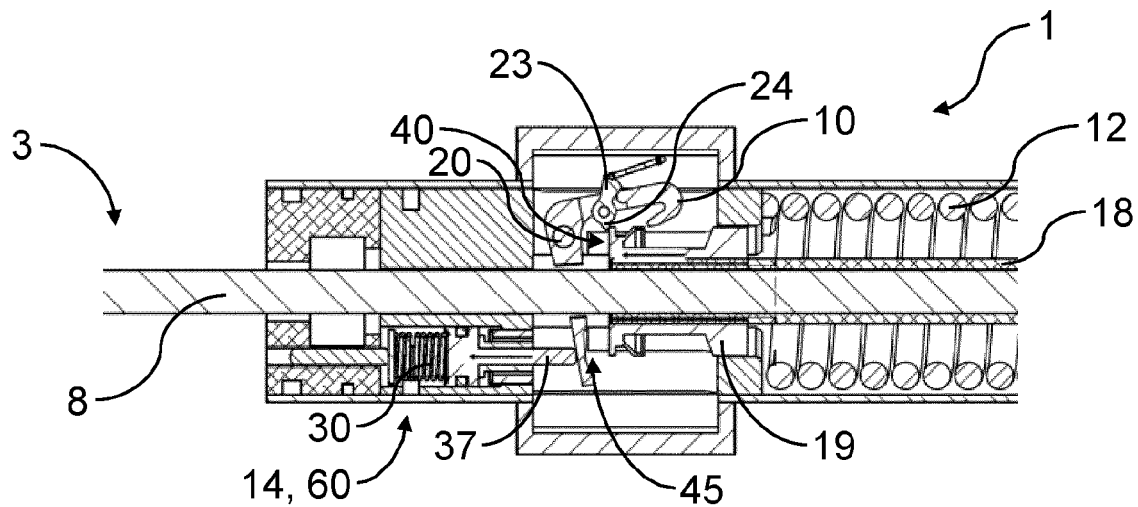
FIG. 11 shows a longitudinal section through the movable end of a power assist device according to the invention in the unlocked state with the piston rod in an intermediate position.

FIG. 11 shows a state in which, when the arresting means 10 is in the unlocking position, the piston rod 8 is moved from its second position or an intermediate position to its first position. This corresponds to the opening of the laden luggage compartment 2. The contacting component 40 makes contact with the cam 24 of the movable component 23, which rotates clockwise owing to the force which is acting. Owing to the movable component 23 being coupled in terms of movement to the arresting means 10, the arresting means 10 also rotates clockwise about its point of rotation 20. The arresting means 10 therefore rotates from the unlocking position to the arresting position. This leads on the one hand to the overlap of the arresting means 10 with the latching element 19 and on the other hand to the tappet 37 of the damping mechanism 14 being pressed in and to load being applied to the compression spring 30.

Figure 12:
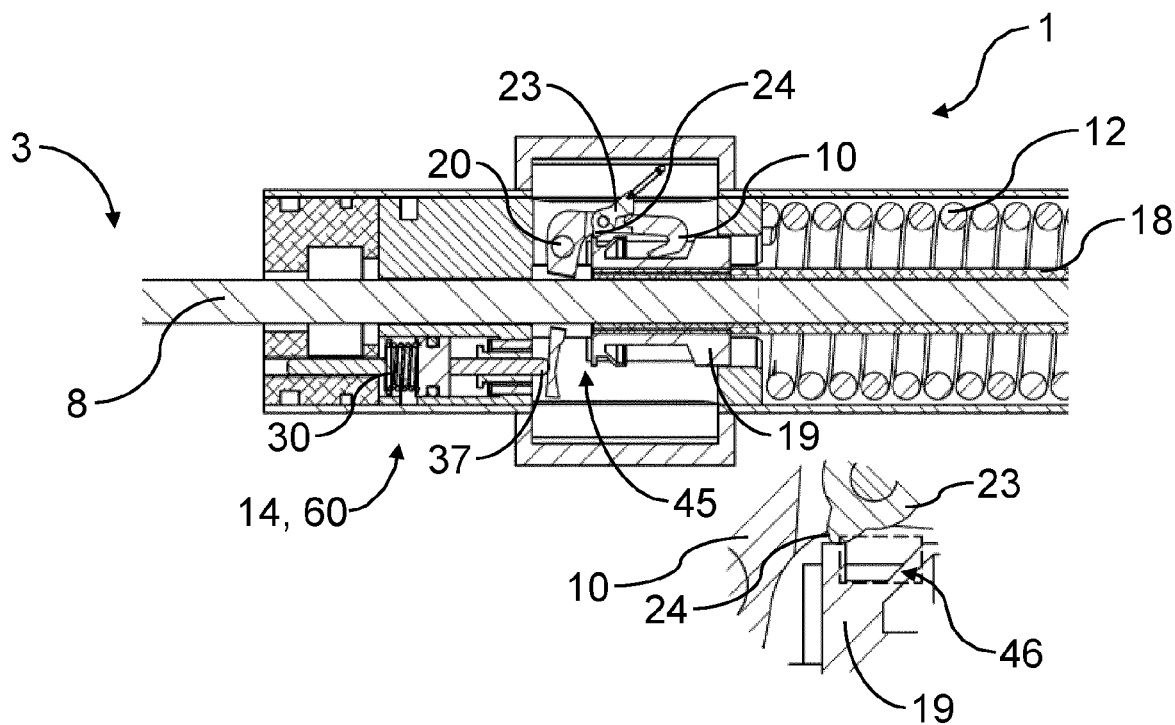
FIG. 12 shows a longitudinal section through the movable end of a power assist device according to the invention with the arresting means in the arresting position and the piston rod in the first position, with an enlarged view of the contacting component and the movable component.

FIG. 12 shows, proceeding from the state shown in FIG. 11, the state after the rotation of the arresting means 10, just before the latching element 19 reaches the stop 45. An enlarged view illustrates that the cam 24 of the movable component 23 can slide over the latching element 19 into a cutout 46. Therefore, the rotation of the movable component 23 and thus also of the arresting means 10 counter-clockwise is enabled again. The arresting means movement device 60 with the damping mechanism 14 can therefore move the arresting means 10 from the arresting position to the unlocking position. When the laden luggage compartment 2 is being closed, the assistance force is therefore available again.

Figure 13:
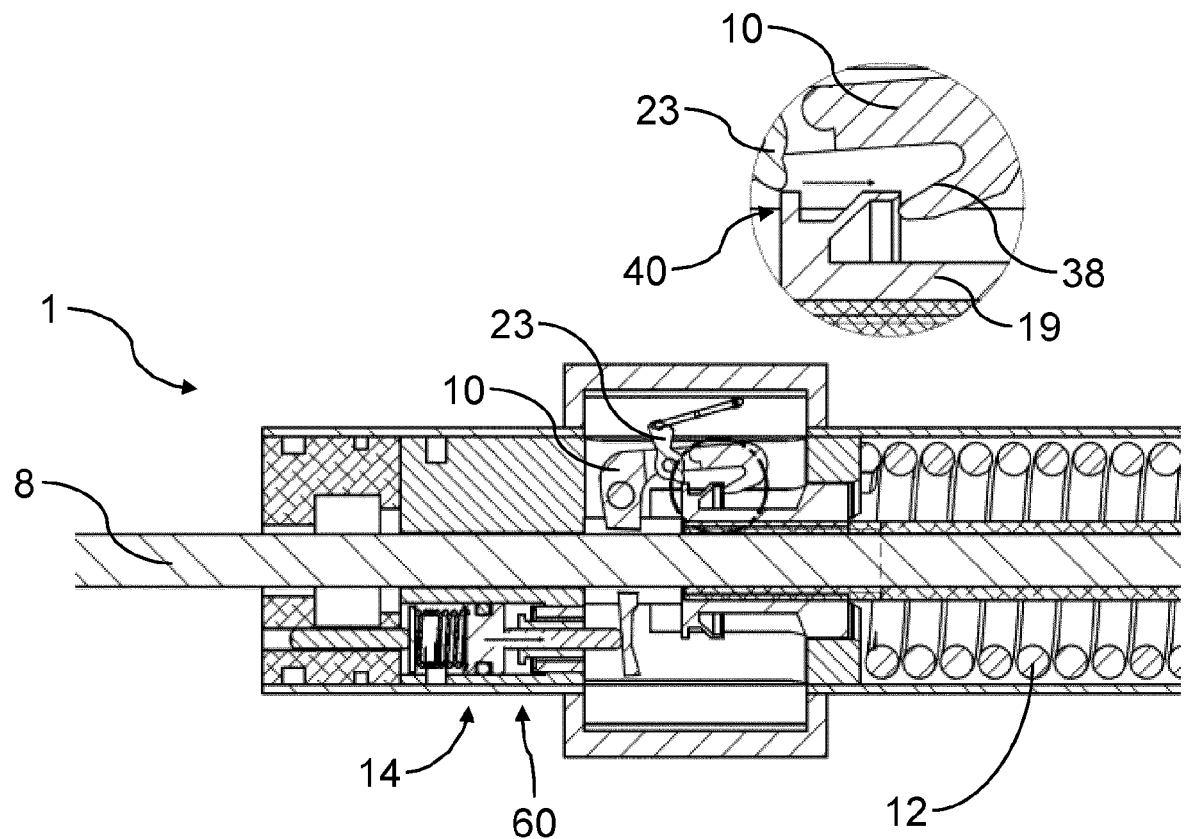
FIG. 13 shows a longitudinal section through the movable end of a power assist device according to the invention with the arresting means in an intermediate position and the piston rod in an intermediate position, with an enlarged view of the arresting means and the latching element.

FIG. 13 shows, proceeding from the state shown in FIG. 11, the state after a movement of the piston rod 8 within the limited period of time generated by the damping mechanism 14. The arresting means 10 has still not been completely brought from the arresting position to the unlocking position. This state corresponds to luggage being removed from the open, laden luggage compartment within the limited period of time. The force applied by the return element 12 exceeds the weight force of the unladen luggage compartment 2 and moves the piston rod 8 toward an intermediate position. The latching element 19 passes the movable component 23. An enlarged view illustrates that the arresting means 10 still overlaps the latching element 19. As the movement of the piston rod 8 toward an intermediate position continues, the contacting component 40 of the latching element 19 makes contact with the oblique region 38 of the arresting means 10.

Figure 14:
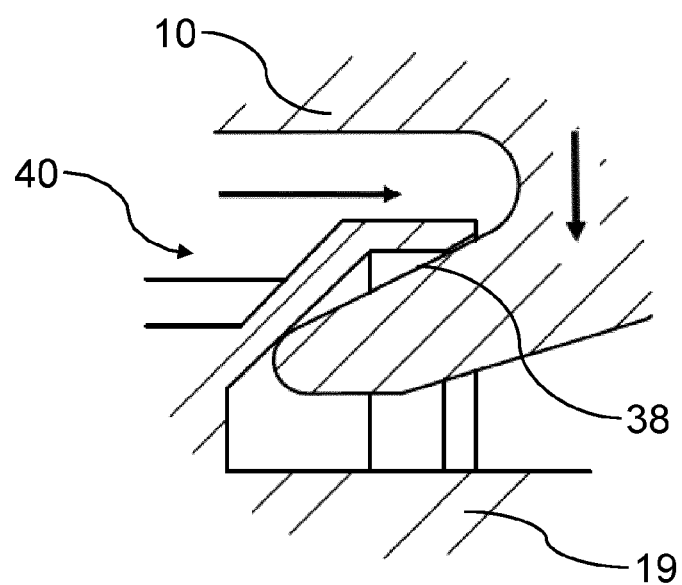
FIG. 14 shows an enlarged view of the arresting means and the latching element.

FIG. 14 shows, proceeding from the state shown in FIG. 13, that the contacting component 40 of the latching element 19 slides on the oblique region 38 of the arresting means 10 as the movement of the piston rod 8 continues toward an intermediate position. As a result, the arresting means 10 rotates clockwise and is brought from an intermediate position between the arresting position and the unlocking position back to the arresting position. At the same time, the arresting means movement device 60 and the damping mechanism 14 are repositioned and the limited period of time starts anew after a movement of the piston rod 8 to the first position, for example owing to the luggage compartment 2 being loaded with luggage.

Figure 15:
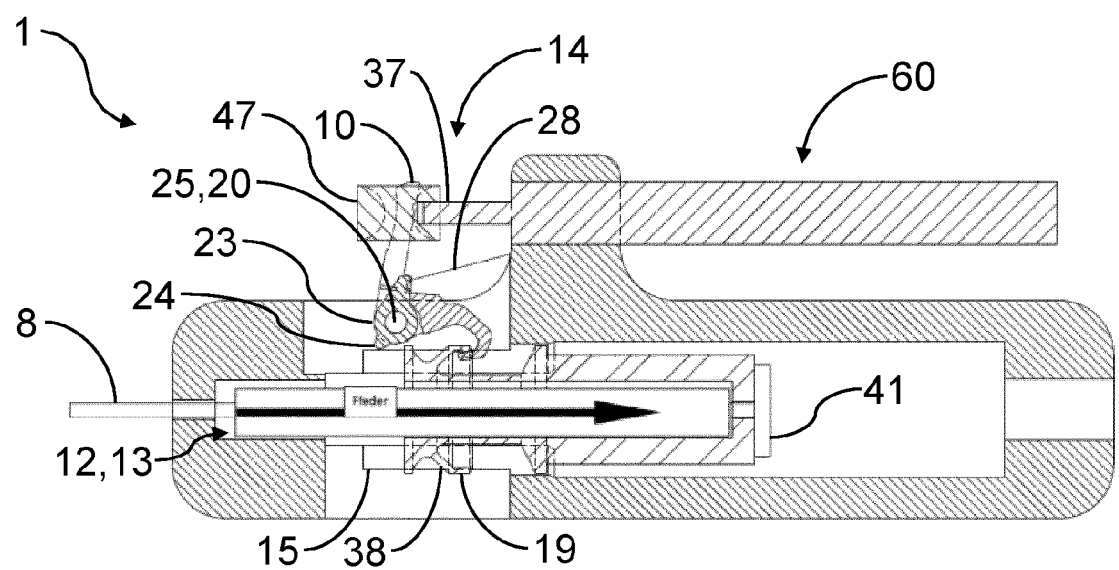
FIG. 15 shows a partial longitudinal section through a further power assist device according to the invention.

FIG. 15 shows a further exemplary embodiment according to the invention. Components and functional units which are similar or identical to the preceding exemplary embodiments in terms of function and/or design are denoted by the same reference signs and are not described separately again. The statements made relating to FIGS. 1 to 14 therefore correspondingly apply to FIG. 15. In this exemplary embodiment, the positions of the point of rotation 25 of the movable component 23 and the point of rotation 20 of the arresting means 10 coincide. The design of the arresting means 10, of the movable component 23 with the cam 24 and of the latching element 19, and also of the locking housing 15 are matched to the exemplary embodiment shown in FIGS. 1 to 14, and therefore all the functional features can be implemented. The arresting means movement device 60 and the damping mechanism 14 are outside the locking housing 15 and are coupled in terms of movement to the arresting means 10 via a bearing piece 47. The return element 12 in the form of a compression spring 13 is inside the latching element 19 and is supported against the locking housing 15 and the latching element 19.

Figure 16:
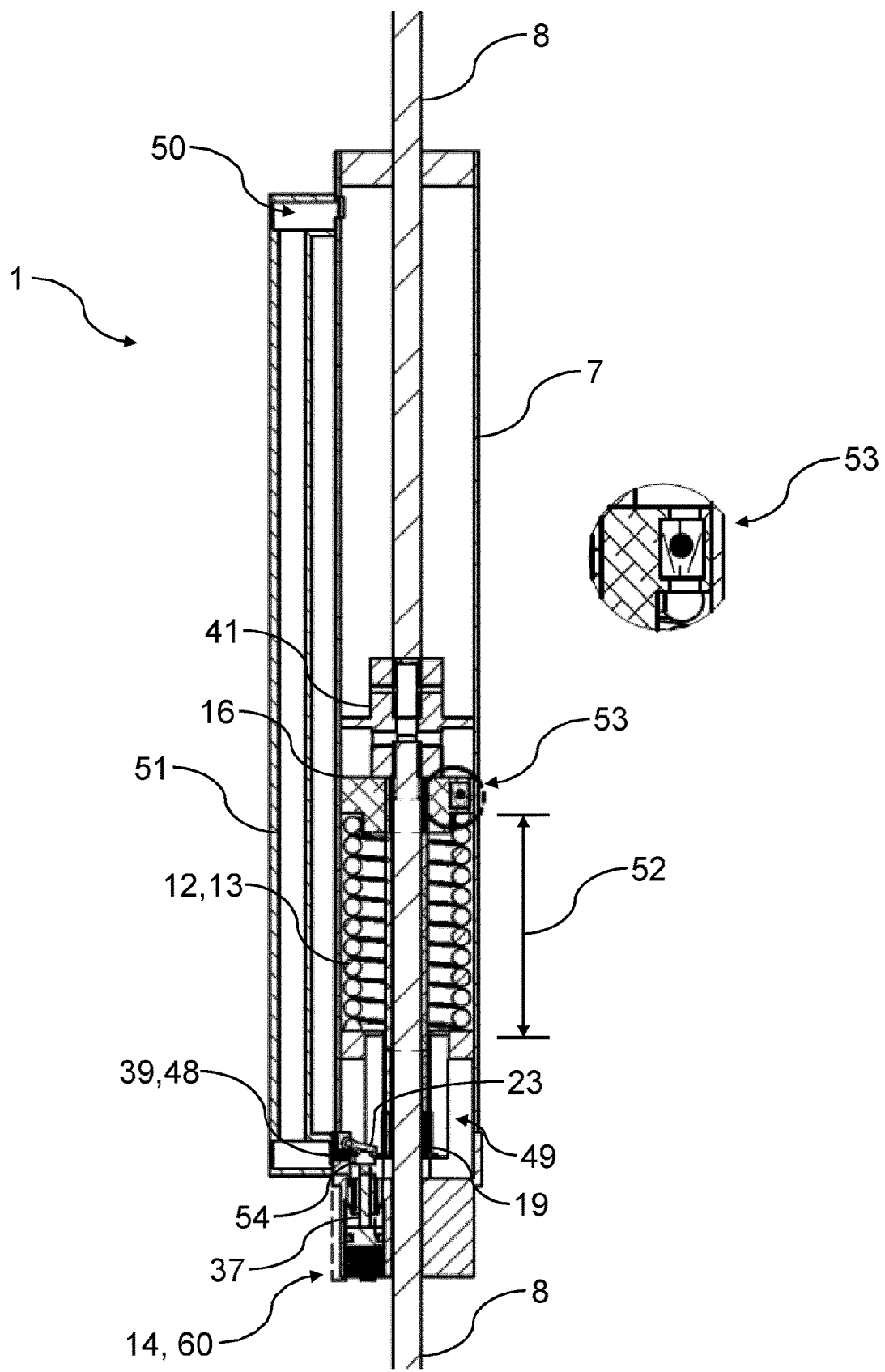
FIG. 16 shows a longitudinal section through a power assist device according to the invention with a hydraulic implementation of the arresting mechanism in the arresting position, with an enlarged view of the non-return valve.

FIG. 16 shows a further exemplary embodiment according to the invention. Components and functional units which are similar or identical to the preceding exemplary embodiments in terms of function and/or design are denoted by the same reference signs and are not described separately again. The statements made relating to FIGS. 1 to 15 therefore correspondingly apply to FIG. 16. In this exemplary embodiment, the latching element 19 is arrested by means of a hydraulic mechanism. The latching element 39 is a valve 48 in this case. In this case, the power assist device 1 comprises two fluid chambers 49, 50, which are filled with a hydraulic liquid and are connected to one another by the valve 48. The two fluid chambers 49, 50 are separated from one another by the spring disk 16. A fluid chamber 49 extends between the valve 48 and the spring disk 16 and contains the return element 12. A further fluid chamber 50 extends between the spring disk 16 and the valve 48 via a connecting channel 51. The position of the spring disk 16 and therefore also the length 52 of the return element 12 in this way establish the volume of the two fluid chambers 49, 50 and their volume ratio. A movement of the spring disk 16 is then only possible when the valve 48 is open. A non-return valve 53, which is illustrated on an enlarged scale and enables a movement of the spring disk 16 in one direction when the valve 48 is closed, is additionally attached to the spring plate 16. The valve 48 in the open state forms the unlocked state and in the closed state forms the arrested state. A loaded compression spring 13 is therefore arrested when the valve 48 is closed. A compression spring 13 that is relieved of load can be subjected to load owing to the non-return valve 53 when the valve 48 is closed, and is then arrested. Moreover, an arresting means movement device 60 with a damping mechanism 14 like in the preceding exemplary embodiments is present, wherein in this case the tappet 37 is coupled in terms of movement to an actuator 54, which has an inclined plane 55 in contact with the valve 48.

Figure 17:
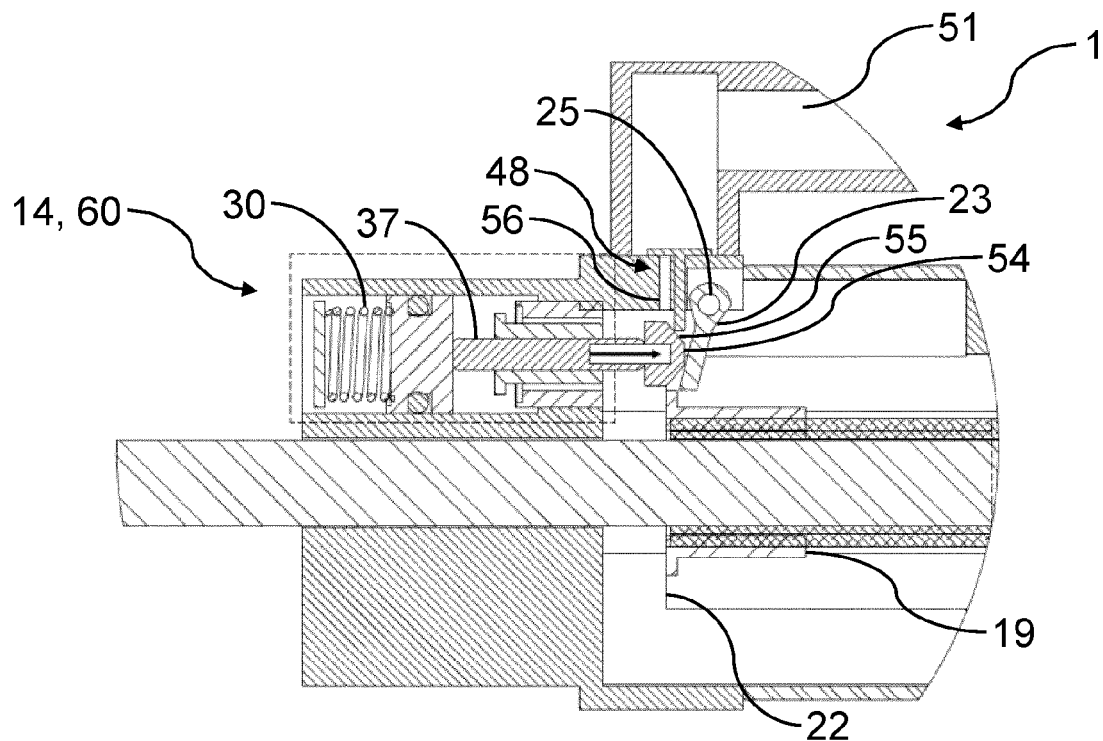
FIG. 17 shows a longitudinal section through an enlarged illustration of the arresting mechanism of the power assist device from FIG. 16 in the arresting position.

FIG. 17 shows an enlarged view of the region around the damping mechanism 14 and the valve 48 of the power assist device 1 from FIG. 16 in an arrested state. The valve 48 is closed. The pretension of the compression spring 13 that acts on the spring disk 16 leads to an increase in the hydraulic pressure on that side of the spring disk 16 that faces away from the return element 12. The hydraulic pressure acts via the connecting channel 51 on the valve 48, which remains in its closed position and keeps the valve channel 56 closed. Therefore, when the luggage compartment is unladen, a pressure differential can build up, which keeps the valve 48 in the closed position by itself. The force acting on the valve 48 owing to the pressure differential is greater than the opening force acting on the valve 48 from the loaded compression spring 30 of the damping mechanism 14, with the result that the valve 48 remains closed. In the state which is shown, the latching element 19 is against the stop 22, as is the case when the luggage compartment 2 is laden, when the pre-tensioning of the return element 12 is overcome. The return element 12 exerts no pressure on the spring disk 16 and thus on the valve 48. Therefore, the damping mechanism 14 is able to open the valve 48.

Figure 18:
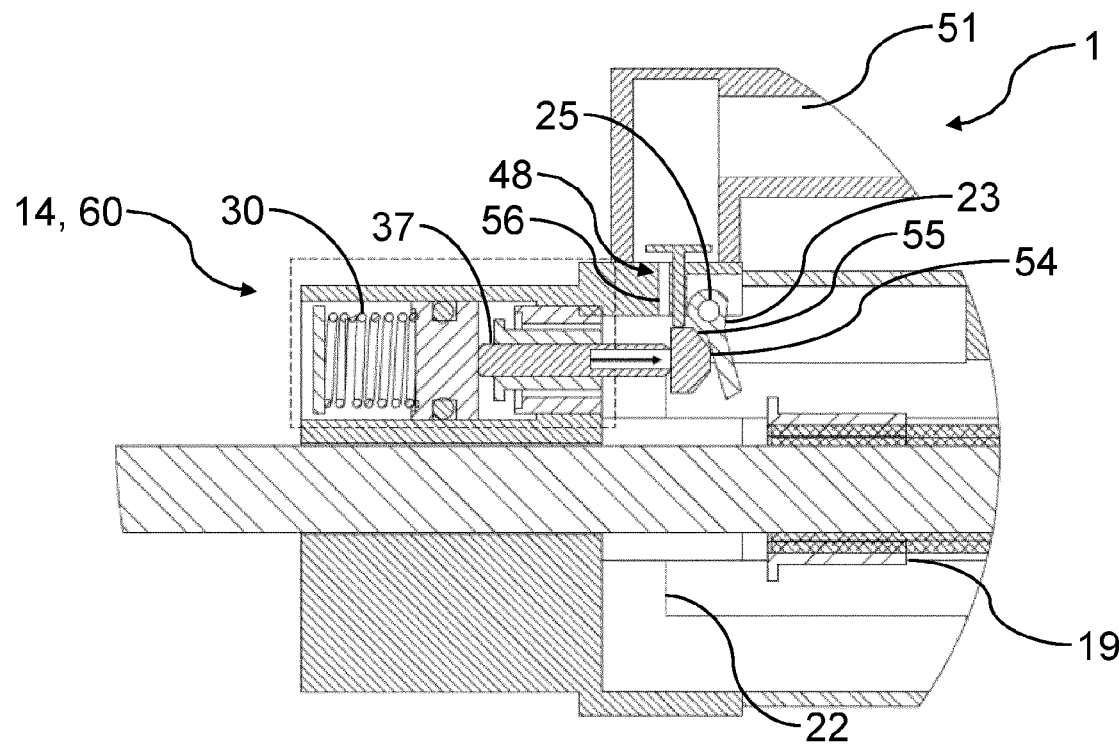
FIG. 18 shows a longitudinal section through an enlarged illustration of the arresting mechanism of the power assist device from FIG. 16 in the unlocking position.

FIG. 18 shows the enlarged view from FIG. 17 after the valve 48 has been opened by the damping mechanism 14. The valve 48 was contacted and opened by the inclined plane 55 of the actuator 54. Hydraulic liquid can flow through the valve channel 56. Therefore, a movement of the spring disk 16 and thus also the action of the assistance force of the return element 12 on the piston rod 8 is possible. During this movement, the latching element 12 can rotate the movable component 23 counter-clockwise about its point of rotation 25 and pass it.

Figure 19:
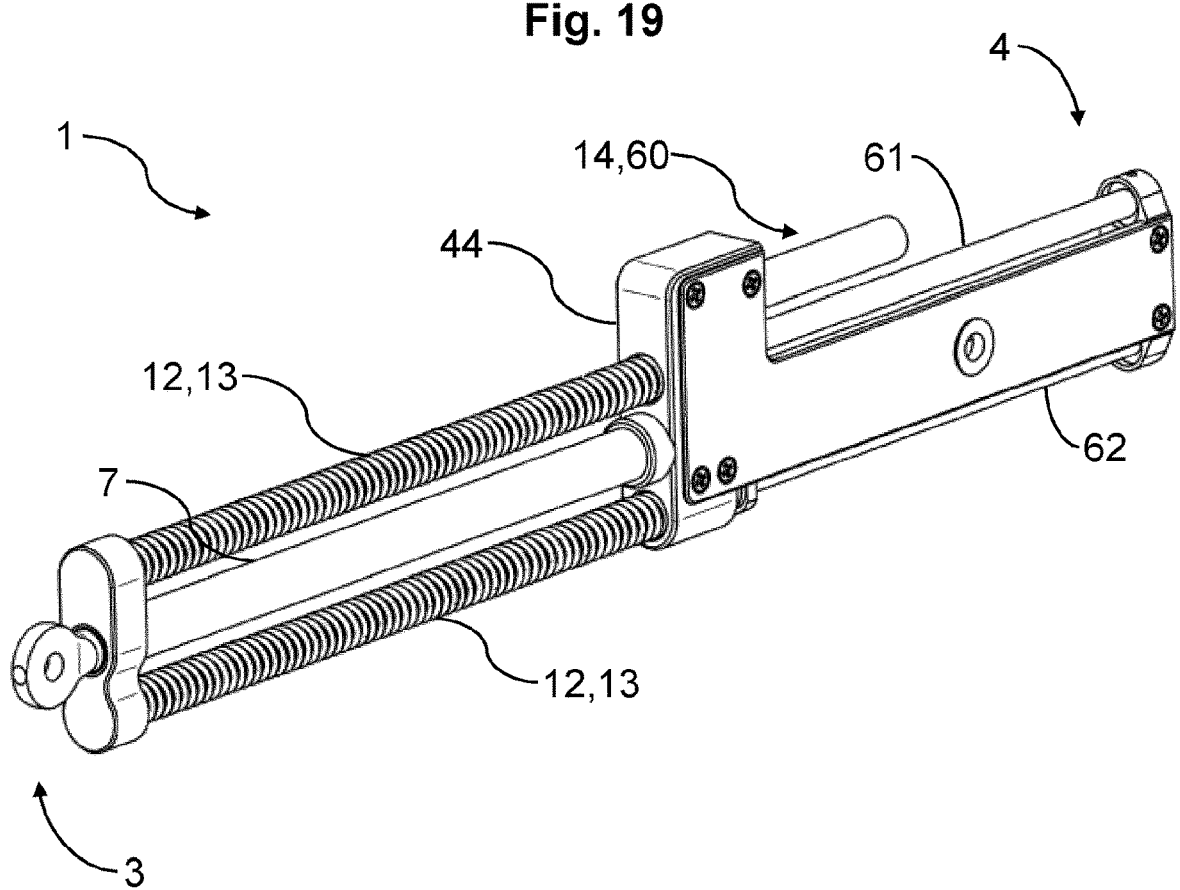
FIG. 19 shows a perspective illustration of a further power assist device according to the invention.

FIG. 19 shows a further exemplary embodiment according to the invention. Components and functional units which are similar or identical to the preceding exemplary embodiments in terms of function and/or design are denoted by the same reference signs and are not described separately again. The statements made relating to FIGS. 1 to 18 therefore correspondingly apply to FIG. 19. In this exemplary embodiment, the power assist device 1 comprises two return elements 12 in the form of compression springs 13. These enclose not the piston rod 8, but a respective guide rod 61, 62. A sleeve-shaped housing 7, inside which is the piston rod 8, is formed between the return elements 12. The arresting means movement device 60 with the damping mechanism 14 is formed on the outside in relation to the parallel guide rods 61, 62 and the piston rod 8 inside the housing 44. The housing 44 extends toward the fixed end 4. The other end of the power assist device 1 is designated by the movable end 3. There can also be a further housing 7 around the housing 7 and/or the housing 44.

Figure 20:
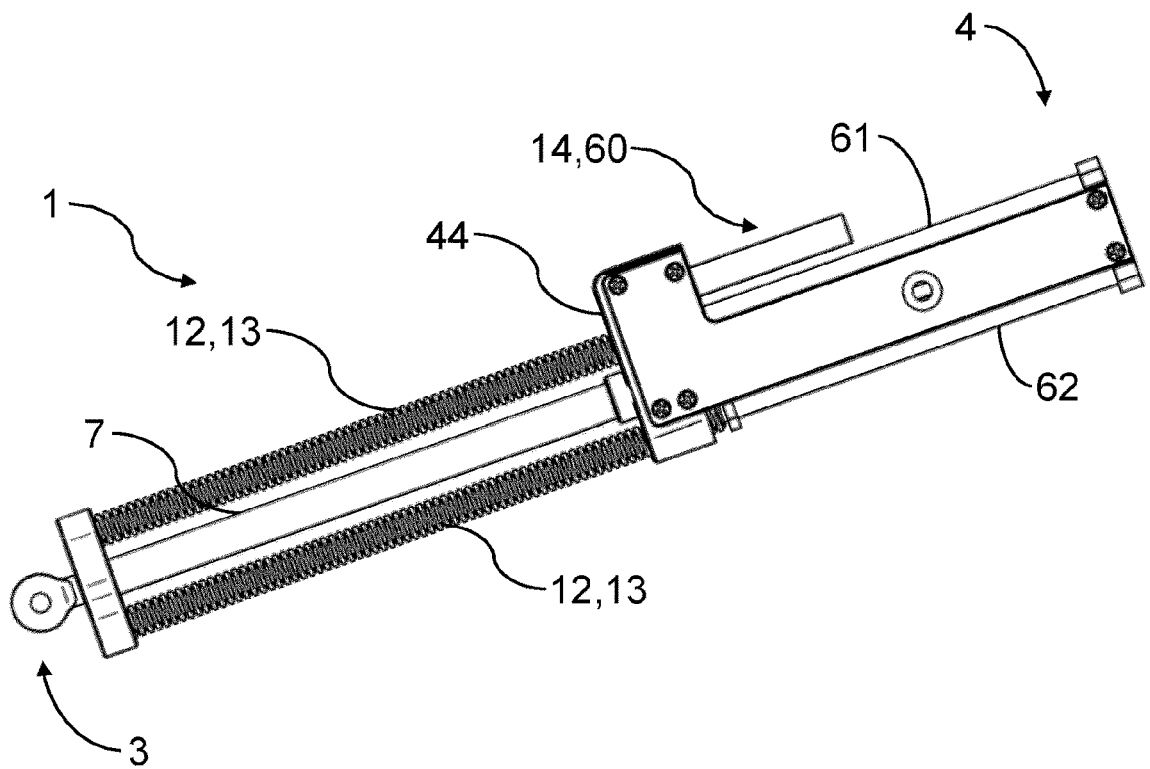
FIG. 20 shows a further side view of the power assist device from FIG. 19.

FIG. 20 shows a further side view of the power assist device 1 from FIG. 19. The visible elements are the same as in FIG. 19.

Figure 21:
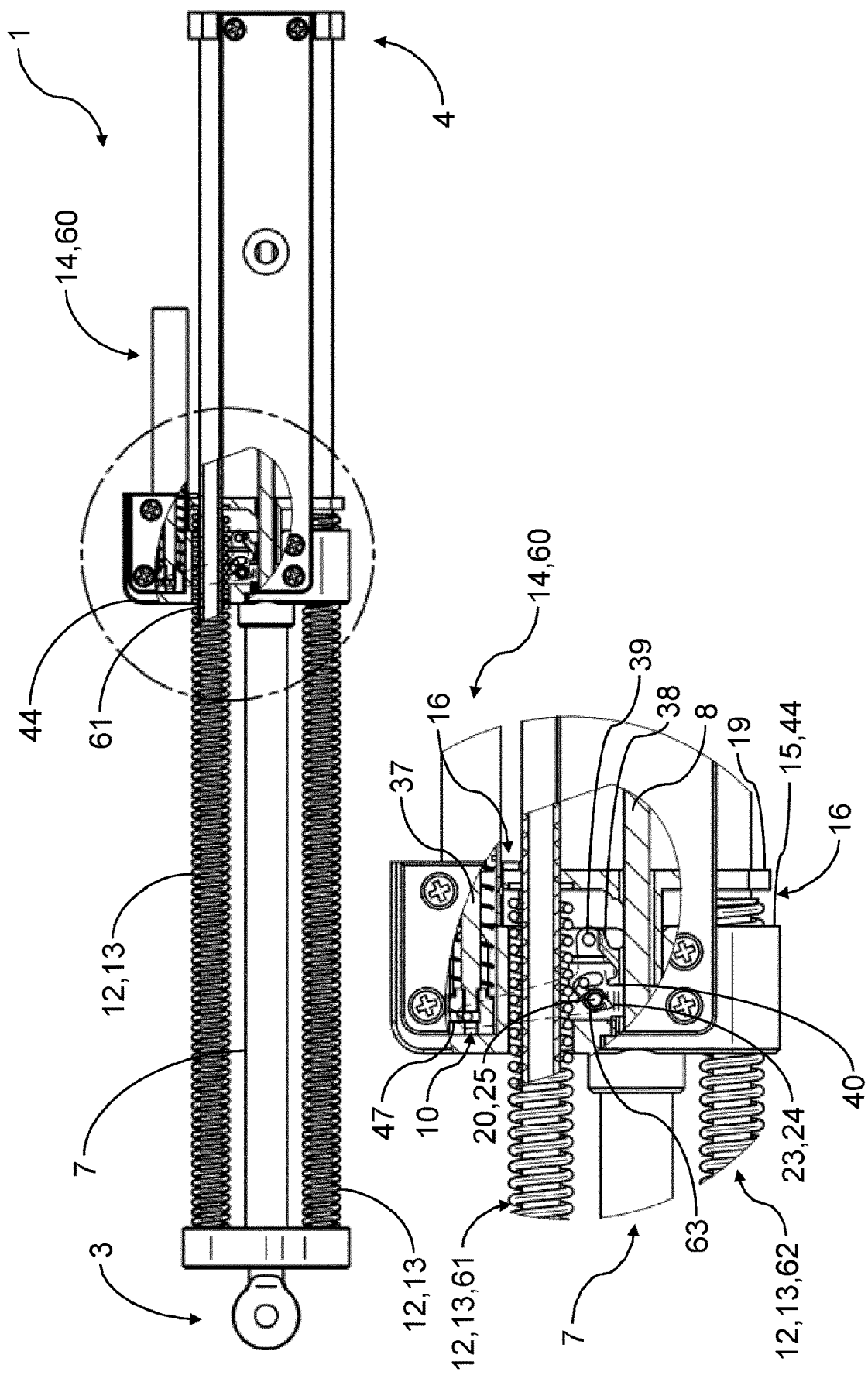
FIG. 21 shows the power assist device from FIG. 20 with a housing illustrated as partially open, with an enlarged view of the illustrated opening of the housing.

FIG. 21 shows the power assist device 1 from FIG. 20 with the housing 44 illustrated as partially open. This portion is moreover illustrated on an enlarged scale. In the enlarged view, it can be seen that the return elements 12 in the form of compression springs 13 slide on the guide rods 61, 62. The compression springs 13 are supported against a spring plate 16 formed on the latching element 19. The piston rod 8 is inside the housing 7. The arresting means 10 is illustrated with line hatching and can be rotated about a point of rotation 20. The point of rotation 20 coincides with the point of rotation 25 of a component 23 with a cam 24. In this exemplary embodiment, the arresting means 10 comprises the locking element 39, whereas the oblique region 38 is formed on the latching element 19. The contacting component 40 is moreover formed on the latching element 19. Instead of a tension spring 28, a leg spring 63 is used to keep the component 23 with the cam 24 in contact with the arresting means 10. The arresting means 10 is connected to the tappet 37 of the arresting means movement device 60 with damping mechanism 14 via a bearing piece 47. Moreover illustrated is the locking housing 15, which is part of the housing 44. The mode of operation of bringing the arresting means 10 into the arresting position by bringing the cam 24 into contact with the contacting component 40 with pressing of the tappet 37 into the arresting means movement device 60 is in this respect the same as the other exemplary embodiments. In the arresting position of the arresting means 10, there is the option of latching the latching element 19 to the locking element 39.

Figure 22:
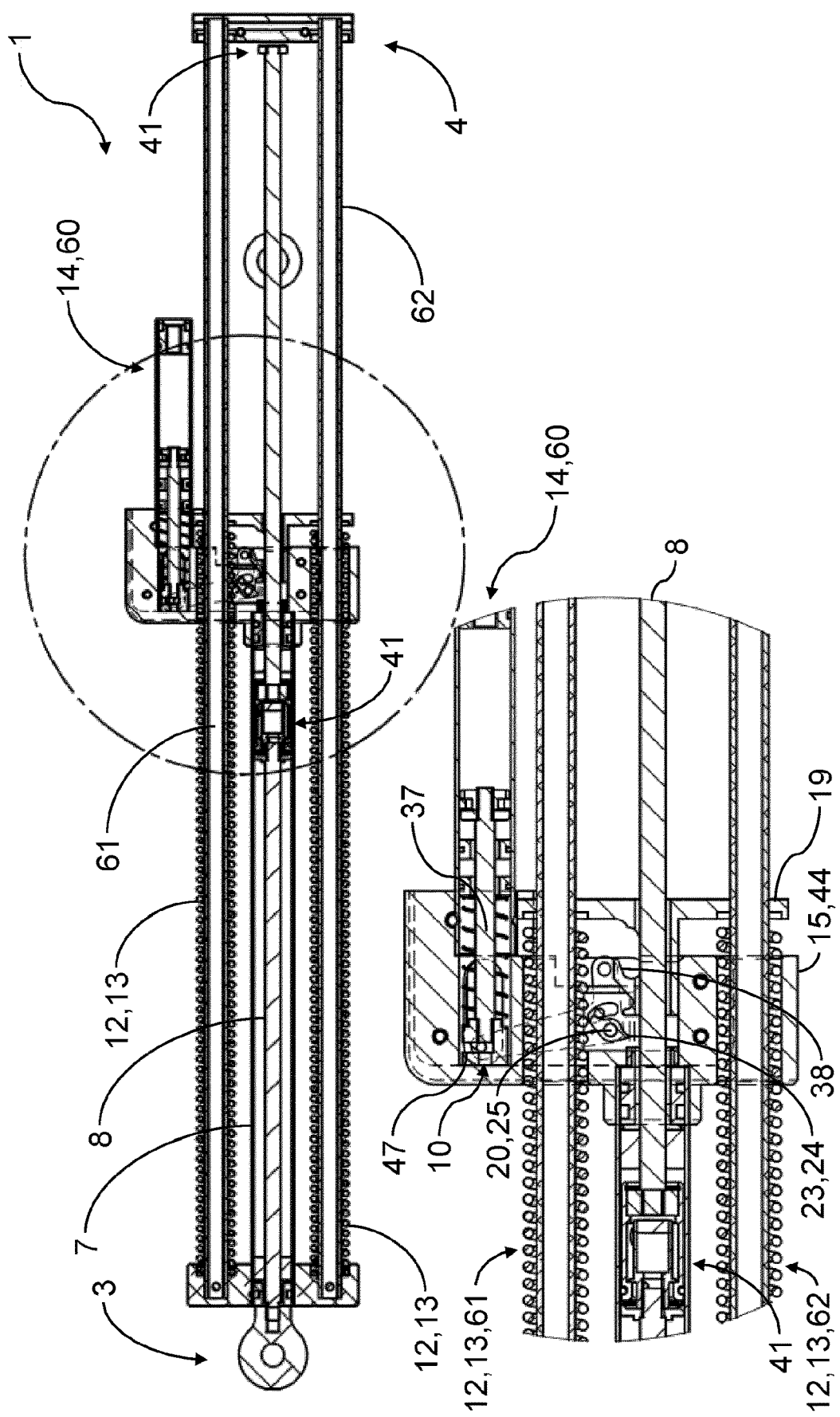
FIG. 22 shows a sectional view through the power assist device fro FIG. 21 in the same state as in FIG. 21 and with an enlarged view of the region around the arresting means.

FIG. 22 shows a sectional view through the power assist device 1 from FIG. 21 in the same state as in FIG. 21 and with an enlarged view of the region around the arresting means 10. In addition, damper pistons 41 are illustrated.

Figure 23:
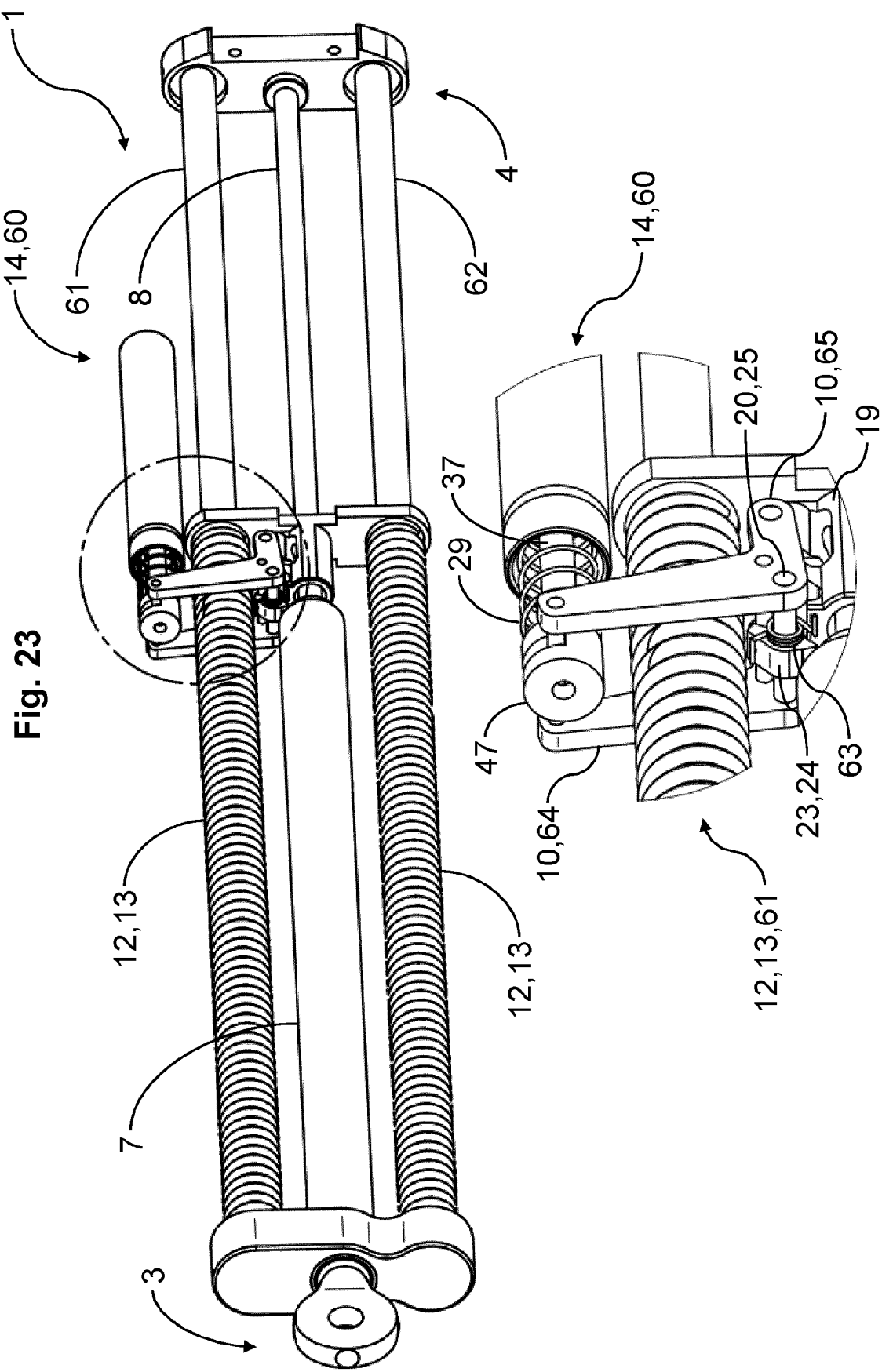
FIG. 23 shows a perspective illustration of the power assist device from FIG. 22 without a housing.

FIG. 23 shows a perspective illustration of the power assist device from FIG. 22 without a housing 44. It can be seen that the arresting means 10 consists of two interconnected parts 64, 65, between which is the bearing piece 47 with the spring 29 and the tappet 37 of the arresting means movement device 60. Moreover, the movable component 23 with the cam 24 is attached between the parts 64, 65, the movable component being held under loading by means of the leg spring 63.

What is therefore proposed is to design a power assist device 1 comprising a piston rod 8, which is mounted so as to be able to move in a housing 7 and has a first position and a second position, and a preferably elastic return element 12, which can be arrested by means of a positionally variable arresting means 10, by means of which an assistance force can be transmitted to the piston rod 8 in the unlocked state, and which in the arrested state is decoupled in terms of force by the piston rod 8, such that, in the unlocked state, a movement of the piston rod 8 to the first position moves the arresting means 10 from an unlocking position to an arresting position, which enables arresting of the return element 12 only within a limited period of time.

LIST OF REFERENCE SIGNS

1 Power assist device
2 Luggage compartment
3 Movable end
4 Fixed end
5 Support
6 Point of rotation
7 Housing
8 Piston rod
9 Hook
10 Arresting means
11 Spring
12 Return element
13 Compression spring
14 Damping mechanism
15 Locking housing
16 Spring disk
17 Arresting mechanism
18 Casing tube
19 Latching element
20 Point of rotation
21 Cutout
22 Circumferential surface
23 Component
24 Cam
25 Point of rotation
26 Point
27 Point
28 Tension spring
29 Spring
30 Compression spring
31 Auxiliary return element
32 Piston
33 Lifting element
34 Connecting channel
35 Damping element
36 Non-return valve
37 Tappet
38 Oblique region
39 Locking element
40 Contacting component
41 Damper piston
42 Fixedly connected counter support
43 Movably mounted counter support
44 Housing
45 Stop
46 Cutout
47 Bearing piece
48 Valve
49 Fluid chamber
50 Fluid chamber
51 Connecting channel
52 Length
53 Non-return valve
54 Actuator
55 Inclined plane
56 Valve channel
57 Mating contact
58 Seal
59 Connecting element
60 Arresting means movement device 61 Guide rod
62 Guide rod
63 Leg spring
64 Part
65 Part

The invention claimed is:

1. A power assist device (1), comprising:
a movably mounted piston rod (8), which has a first position and a second position;
a return element (12), which is arrestable via a positionally variable arresting means (10), by which an assistance force is transmittable to the piston rod (8) in an unlocked state, and which in an arrested state is decoupled in terms of force by the piston rod (8); and
wherein in the unlocked state, a movement of the piston rod (8) to the first position moves the arresting means (10) from an unlocking position to an arresting position, which enables arresting of the return element (12) only within a limited period of time.

2. The power assist device (1) as claimed in claim 1, wherein the return element (12) is arrestable and unlocked when powered off.

3. The power assist device (1) as claimed in claim 1, wherein, in the unlocked state in the arresting position, a force generated by an arresting means movement device acts on the arresting means (10) and automatically moves the arresting means (10) back to the unlocking position.

4. The power assist device (1) as claimed in claim 3, wherein the arresting means movement device comprises at least one of a) a mechanical auxiliary return element (31) preferably in the form of which comprises a spring (29), or b) a movable lifting element (33) and a damping element (35), wherein the damping element (35) retards a movement of the lifting element (33).

5. The power assist device (1) as claimed in claim 1, wherein the arresting takes place in that at least one of a) the piston rod (8) is moved from the first position to an intermediate position between the first and the second position, or a loading force acting on the piston rod (8) is lowered below a force brought about by the return element (12).

6. The power assist device (1) as claimed in claim 1, wherein the arresting takes place by latching the arresting means (10) to a latching element (19), and the latching element (19) comprises a counter support (43) for the return element (12).

7. The power assist device (1) as claimed in claim 1, wherein an oblique region (38), which is slidable on a locking element (39), is formed on the arresting means (10).

8. The power assist device (1) as claimed in claim 1, wherein the return element (12) is clamped in between a first counter support (42), which is fixedly connected to a housing (7, 44), and a second counter support (43), which is mounted for movement relative to the housing (7, 44).

9. The power assist device (1) as claimed in claim 1, further comprising two fluid chambers (49, 50), which are filled with a hydraulic liquid and are connected to one another by a valve (48), a volume of one of the two fluid chambers (49, 50) is set by a length (52) of the return element (12), and the valve (48) in an open state forms the unlocked state and the valve in the closed state forms the arrested state.

10. The power assist device (1) as claimed in claim 9, wherein the arresting means (10) in the unlocking position keeps the valve (48) in the open state.

11. The power assist device (1) as claimed in claim 1, further comprising in a mating contact (57) that is coupled in terms of movement to the arresting means (10) and the movement of the piston rod (8) to the first position causes mechanical contact to be made between a contacting component (40), moved by the piston rod (8), and the mating contact (57) and a movement thereof, resulting in the arresting means (10) being moved from the unlocking position to the arresting position.

12. The power assist device (1) as claimed in claim 11, wherein a movement of the piston rod (8) from the first to the second position causes mechanical contact to be made between the contacting component (40), moved by the piston rod (8), and the mating contact (57) and a return movement thereof, and the return movement is decoupled by the arresting means (10).

13. The power assist device (1) as claimed in claim 1, wherein at least one of a) the arresting means (10) comprises a hook (9) or b) the arresting means (10) is mounted to as to be rotatable about a point of rotation (20).

14. The power assist device (1) as claimed in claim 11, wherein the mating contact (57) is implemented on a component (23) which is mounted so as to be able to rotate about a point of rotation (25), and the component (23) from a starting position moves the arresting means (10) to the arresting position when rotated in a direction of rotation.

15. A method for operating a power assist device (1) as claimed in claim 1, the method comprising: with the power assist device (1) initially in the unlocked state and the piston rod (8) in the second position, then applying a force which exceeds and counteracts the assistance force to the piston rod (8), resulting in the piston rod (8) moving into the first position, and subsequently, within the limited period of time, lowering the applied force below the assistance force, with the result that the return element (12) arrests.

16. The power assist device (1) as claimed in claim 3, wherein at least one of a) the arresting means movement device comprises a hydraulic damping mechanism (14), or b), in the arrested state, a movement of the arresting means (10) from the arresting position to the unlocking position is prevented.

17. The power assist device (1) as claimed in claim 4, wherein a force that is generated by the arresting means movement device (14) and acts on the arresting means (10) is chosen such that a movement of the arresting means (10) from the arresting position to the unlocking position is retarded for a period of time of up to 20 seconds.

18. The power assist device (1) as claimed in claim 7, wherein the locking element (39) is a contacting component (40) or a valve (48).

19. The power assist device (1) as claimed in claim 8, wherein the second counter support (43) is connected fixedly in terms of movement to a contacting component (40) via a connecting element (59) which runs toward the piston rod (8), a locking element (39) is formed on the arresting means (12) and comprises the contacting component (40).

20. The power assist device (1) as claimed in claim 14, wherein, in the event of deflection from the starting position, a return force that returns the component (23) to the starting position acts on the component (23).

* * * * *